United States Patent
Seki

(10) Patent No.: US 7,839,880 B2
(45) Date of Patent: Nov. 23, 2010

(54) OFDM COMMUNICATION SYSTEM AND OFDM COMMUNICATION METHOD

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 376 days.

(21) Appl. No.: 11/896,446

(22) Filed: Aug. 31, 2007

(65) Prior Publication Data

US 2007/0297323 A1 Dec. 27, 2007

(51) Int. Cl.
*H04Q 11/02* (2006.01)
*H04J 11/00* (2006.01)
*H04W 72/00* (2009.01)

(52) U.S. Cl. ............... 370/430; 370/343; 370/344; 455/452.1; 455/450

(58) Field of Classification Search ............ 370/208, 370/430; 455/450, 452.2, 454, 452.1
See application file for complete search history.

(56) References Cited

U.S. PATENT DOCUMENTS

| | | | |
|---|---|---|---|
| 6,400,679 B1 | 6/2002 | Suzuki | |
| 6,567,383 B1 | 5/2003 | Bohnke | |
| 7,133,352 B1* | 11/2006 | Hadad | 370/208 |
| 7,236,792 B2* | 6/2007 | Uchida et al. | 455/452.1 |
| 2004/0066312 A1* | 4/2004 | Hoctor et al. | 340/870.07 |
| 2004/0156386 A1 | 8/2004 | Atarashi et al. | |
| 2005/0002421 A1* | 1/2005 | Ito et al. | 370/474 |
| 2005/0030887 A1* | 2/2005 | Jacobsen et al. | 370/208 |
| 2005/0111406 A1* | 5/2005 | Pasanen et al. | 370/329 |
| 2006/0120395 A1* | 6/2006 | Xing et al. | 370/431 |
| 2006/0146869 A1* | 7/2006 | Zhang et al. | 370/465 |
| 2006/0187872 A1* | 8/2006 | Rich | 370/328 |
| 2008/0070586 A1* | 3/2008 | Kermoal et al. | 455/452.2 |
| 2008/0310537 A1* | 12/2008 | Mukai | 375/260 |

FOREIGN PATENT DOCUMENTS

| | | |
|---|---|---|
| JP | 8-331093 | 12/1996 |
| JP | 9-205411 | 8/1997 |
| JP | 2000-032565 | 1/2000 |
| JP | 2000-115834 | 4/2000 |
| JP | 2002-247004 | 8/2002 |
| JP | 2002-319917 | 10/2002 |
| JP | 2004-193888 | 7/2004 |
| JP | 2004-297756 | 10/2004 |
| JP | 2004-364035 | 12/2004 |
| WO | EP 1855403 | * 11/2007 |

OTHER PUBLICATIONS

Japanese Patent Office, Notification of Reasons for Refusal, for corresponding Japanese Patent Application No. 2007-505771, with a dispatch date of Nov. 17, 2009. English translation attached.

* cited by examiner

*Primary Examiner*—Ayaz R Sheikh
*Assistant Examiner*—Tarell Hampton
(74) *Attorney, Agent, or Firm*—Myers Wolin, LLC.

(57) ABSTRACT

In an OFDM communication system that performs OFDM data communication by dividing a band region into a plurality of bands and assigning each band to a mobile station, a base station monitors transmission characteristics of the bands and state of use of adjacent bands, then sets whether to use or not use guard band regions between bands for data transmission based upon the transmission characteristics, and the state of use of the adjacent bands.

4 Claims, 19 Drawing Sheets

FIG. 1
(A)
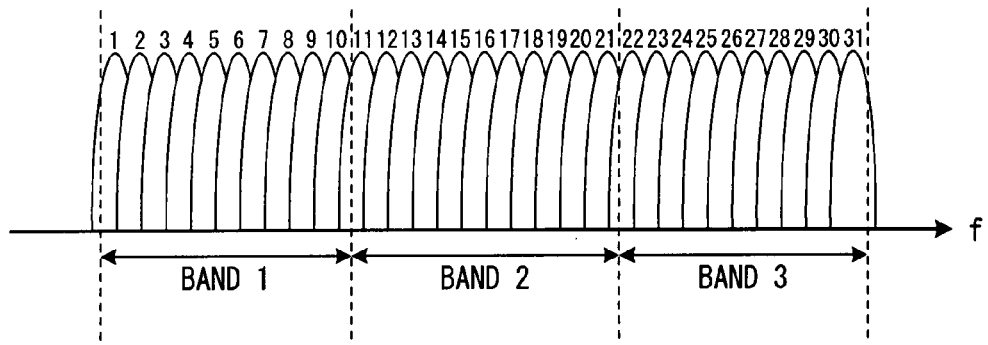
(B)
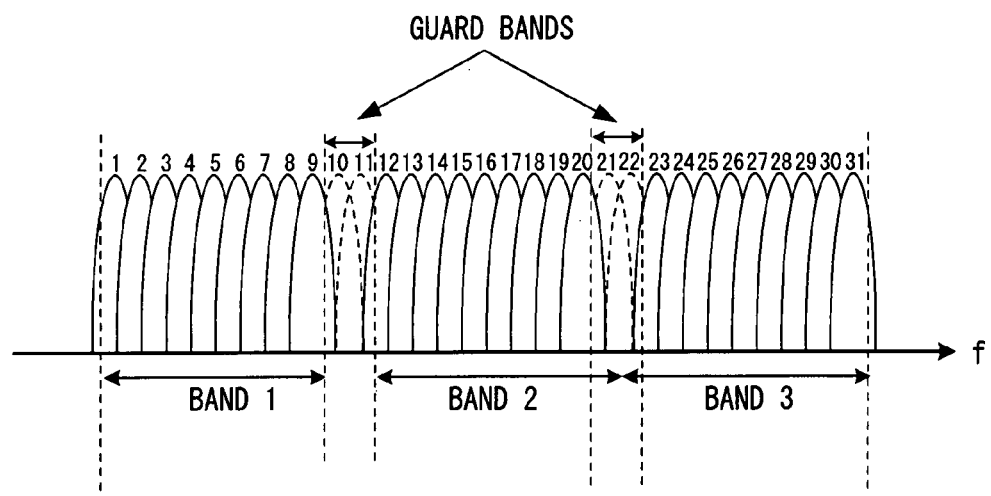
(C)
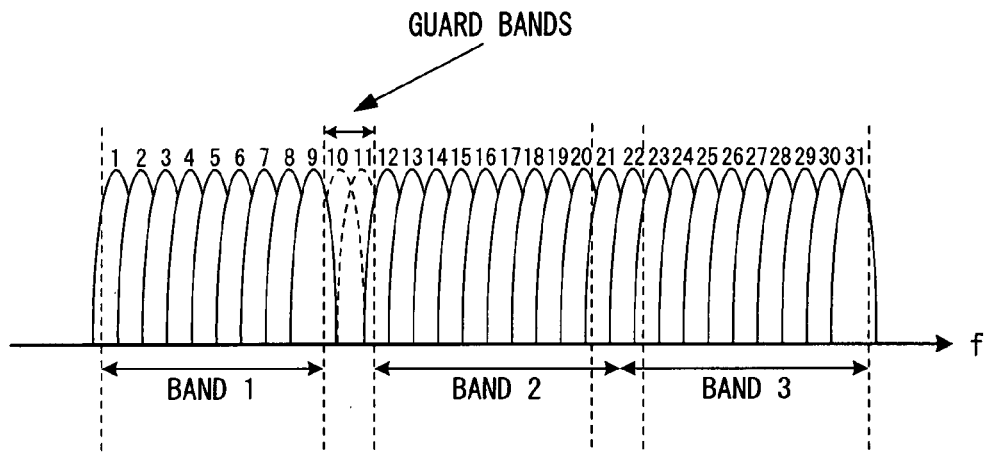

FIG. 17
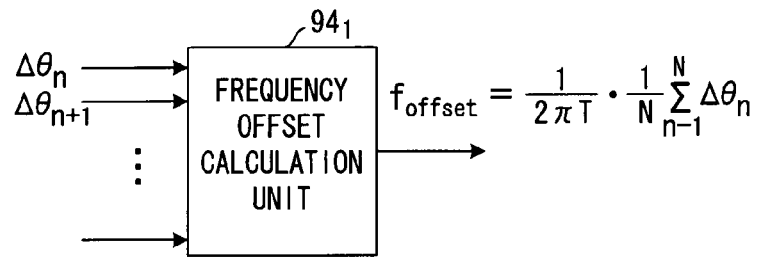
FIG. 18 PRIOR ART
(A)
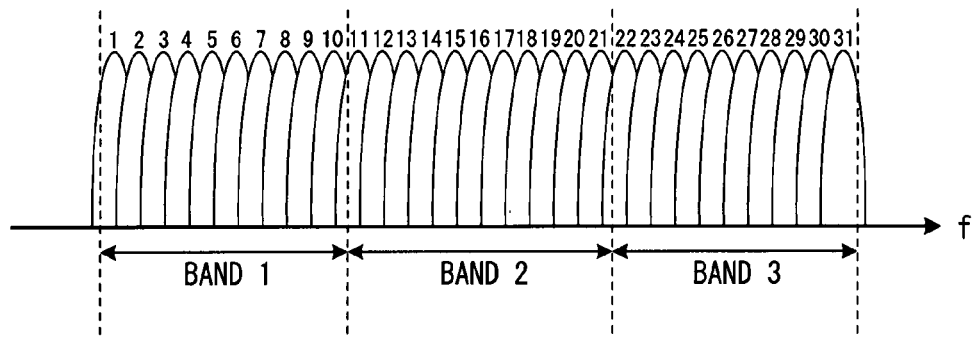
(B)
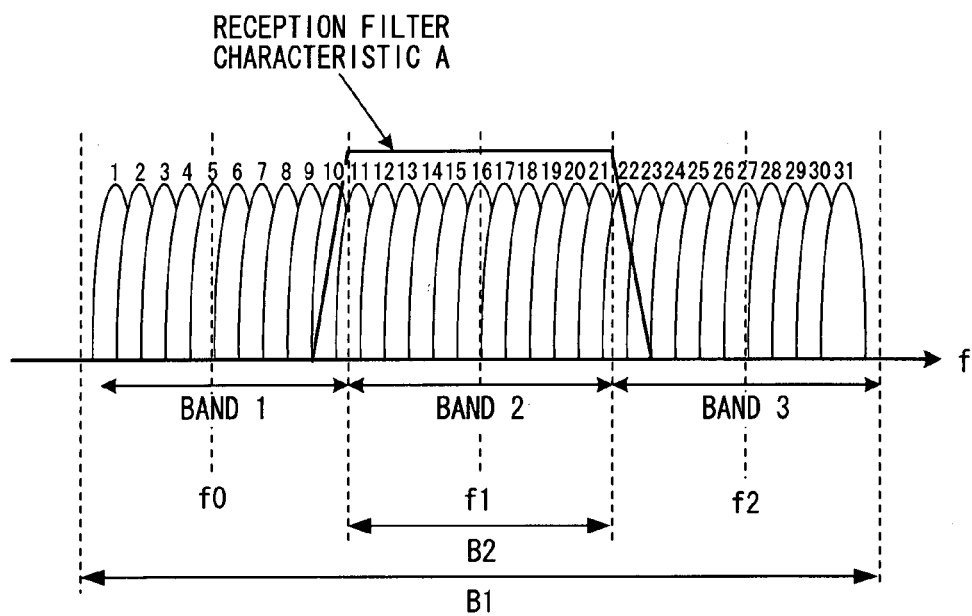

FIG. 25 PRIOR ART
(A)
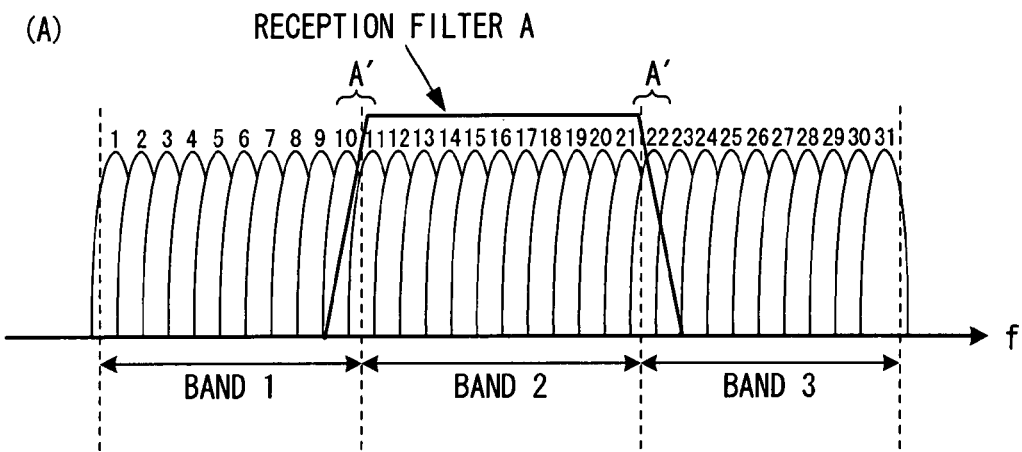
(B)
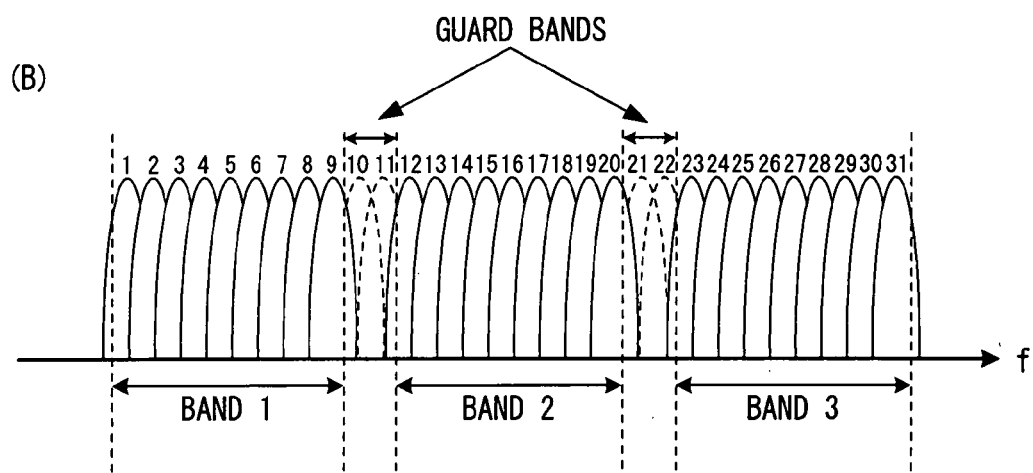
(C)
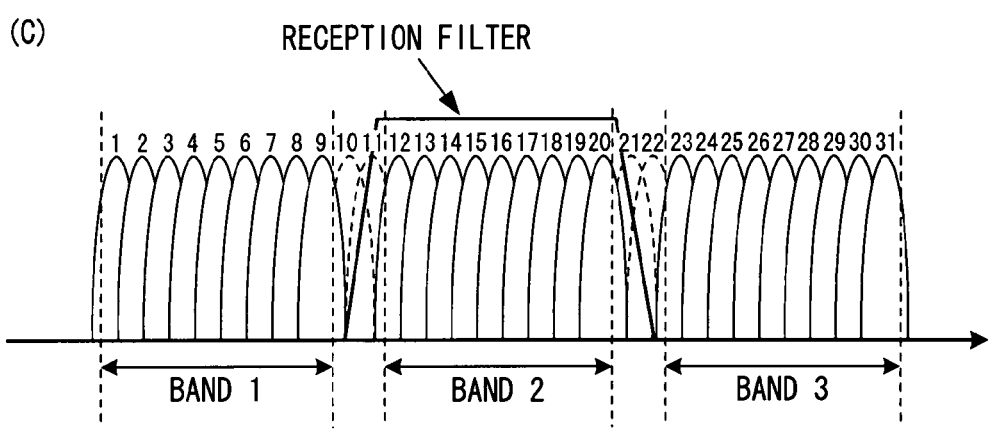

OFDM COMMUNICATION SYSTEM AND OFDM COMMUNICATION METHOD

BACKGROUND OF THE INVENTION

The present invention relates to an OFDM (Orthogonal Frequency Division Multiplexing) communication system and OFDM communication method, and more particularly to the base station, mobile stations and OFDM communication method of an OFDM communication system that divides a band region into a plurality of bands and assigns each band to a mobile station.

OFDMA Access Method

In cellular mobile communication that uses an OFDM communication method, an access method is known called OFDMA (Orthogonal Frequency Division Multiple Access) that multiplexes users by dividing a band region into a plurality of bands and respectively assigning each of the bands to each of a plurality of users. FIG. 18 is a drawing showing the state of user division in a frequency band region of the OFDMA access method. In (A) of FIG. 18 an example is shown in which a band region that comprises 31 subcarriers is divided into 3 bands having 10 subcarriers, 11 subcarriers and 10 subcarriers, and respectively assigns each of the bands to different users.

Applying OFDMA to a Downlink

The construction of a base station transmitter in the case of applying OFDMA to a downlink communication (communication from a base station to a mobile station) is shown in FIG. 19, and the construction of a mobile station receiver is shown in FIG. 20. In a downlink the transmission data for the three users that have been assigned to each of the bands is distributed to each of the subcarriers 1 to 31 shown in (B) of FIG. 18, and input to an IFFT unit 1. The IFFT unit 1 performs IFFT processing on the subcarrier signals and converts them to a time domain signal, and a guard interval insertion unit 2 inserts guard intervals (GI) into that time domain signal. Here, as shown in FIG. 21, a guard interval GI is created by copying the last portion of the OFDM symbol. The baseband signal in which GI have been inserted is converted to an analog signal by a DA converter 3a of a transmission circuit (Tx) 3, after which, a frequency conversion unit 3b converts the frequency to an RF signal having a center frequency f1, and a bandpass filter 3c restricts the band, after which the signal is amplified and transmitted from a transmission antenna 4. In (B) of FIG. 18, the bandwidths and center frequencies of each band in the RF signal after frequency conversion are shown, where a band region having bandwidth B1 (MHz) is divided into three bands of bandwidth B2 (MHz), with the center frequencies of each band being f0, f1 and f2.

Also, the base station uses the frame format shown in FIG. 22 to insert and transmit at fixed intervals well-known pilot signals that are necessary for channel estimation by a mobile station to perform channel estimation. The frame comprises N number of OFDM symbols, and a pilot symbol and control data symbol are inserted for each frame.

The signal that is output from the transmission antenna 4 is received by the reception antenna 5 (FIG. 20) of the mobile station by way of a fading propagation path, and a reception circuit (Rx) 6 converts the RF signal ((B) of FIG. 18) that is received by the antenna to a baseband signal. In other words, the bandpass filter 6a of the passed band region B1 restricts the band of the RF signal that is received by the antenna 5 and inputs the signal to a low-noise amp 6b, and the low-noise amp 6b amplifies the signal to specified power. A mixer 6c multiplies the output signal from the low-noise amp 6b by a local signal having the center frequency of the band to be demodulated, and converts the RF signal after power amplification to a baseband signal. For example, by assuming that band 2 is the object of demodulation by the mobile station, the local oscillator 6d generates a local signal having frequency f1, and the mixer 6c converts the signal to a baseband signal by multiplying that local signal by the RF signal. Here, an example of directly converting from an RF signal to a baseband signal was presented, however, there is also a method of dropping the frequency first to an intermediate frequency.

As shown in (B) of FIG. 18, the signal after baseband conversion is input to an AD converter 6f by way of an anti-aliasing low-pass filter 6e having the property A of a cutoff frequency B2/2 (MHz). An AD converter 6f uses a sampling rate that is double the bandwidth B2 to convert the signal to digital data. Finally, a FIR filter 6g, having a cutoff frequency B2/2 (MHz), extracts the signal of a desired band from the signal after AD conversion and outputs the result.

An FFT timing synchronization circuit 7 detects FFT timing from a time domain signal that includes a signal of a desired band that is output from the reception circuit 6, and a symbol extraction unit 8 extracts the symbol at that timing and inputs it to an FFT unit 9. The FFT unit 9 performs FFT processing for each extracted symbol, and converts the signal to a subcarrier signal in the frequency domain. By calculating the correlation between pilot symbols that are received at set intervals, and a well-known pilot pattern, a channel estimation circuit 10 performs channel estimation for each subcarrier, and a channel compensation circuit 11 uses the estimated channel value to compensate for channel fluctuation of the data symbol. Through the processing described above, the transmission data that is distributed to each of the subcarriers 1 to 31 shown in FIG. 18 is demodulated, however, it is also possible for an OFDMA receiver to perform demodulation of only the subcarrier signals of the band assigned to the local station. In the example shown in FIG. 20, The FFT unit 9 outputs subcarrier signals 11 to 21 of the band 2, and the channel compensation unit 11 performs channel compensation and outputs demodulated data. As shown in the frame format of FIG. 22, the mobile station is notified by way of the time-multiplexed control channel of the information of the band assigned to the local station. After that, the demodulated subcarrier signals 11 to 21 are converted to serial data, and then decoded.

Applying OFDMA to an Uplink

FIG. 23 is a drawing showing the construction of a mobile station when OFDMA is applied to an uplink communication (communication from a mobile station to a base station), and FIG. 24 is a drawing showing the construction of a base station.

As shown in (A) of FIG. 18, band 1 to band 3 are each assigned to different mobile stations $20_1$ to $20_3$. In each of the mobile stations $20_1$ to $20_3$, the transmission data from the users are input to IFFT units $21_1$ to $21_3$ as subcarrier signals 1 to 10, 11 to 21 and 22 to 31. The IFFT units $21_1$ to $21_3$ perform IFFT processing on the respective subcarrier signals, and convert the signals to time-domain signals, after which guard interval units $22_1$ to $22_3$ insert guard intervals GI into the time-domain signals. Transmission circuits (Tx) $23_1$ to $23_3$ convert the input signals to analog signals, and then converts the frequency to an RF signal having center frequencies f0 to f2 that correspond to each band, and after the bands are restricted, the signals are amplified and transmitted from transmission antennas $24_1$ to $24_3$.

The OFDM modulated signals that are transmitted from each of the mobile stations pass through respective propagation paths and are received by the reception antenna 31 (see FIG. 24) of the base station, then the reception circuit (Rx) 32 converts the RF signals to baseband signals. In other words, the bandpass filter 32a of the passing band region B1 restricts the band of the RF signal that is received by the antenna 31 and inputs the result to a low-noise amp 32b, and the low-noise amp 32b amplifies the power of the signal to a specified power. By multiplying the signal output from the low-noise amp 32b by the signal having the center frequency f1 of the band B1 that is output from a local oscillator 32d, a mixer 32c converts the power-amplified RF signal to a baseband signal. The signal after baseband conversion is input to an AD converter 32f via an anti-aliasing low-pass filter 32e having a cut-off frequency B1/2 (MHz). The AD converter 32f uses a sampling rate that is double the bandwidth B1 to convert the signal to digital data and output the result.

A FFT timing synchronization circuit 33 detects the FFT timing from the time domain signal that includes the signals of each of the bands that were output from the reception circuit 32, and at that time, a symbol removal unit 34 extracts symbols, and inputs them to a FFT unit 35. The FFT unit 35 performs FFT processing on each of the extracted symbols, and converts them to frequency domain subcarrier signals. By calculating the correlation between pilot symbols that are received at fixed intervals, and a well-known pilot pattern, a channel estimation circuit 36 performs channel estimation for each subcarrier, and a channel compensation circuit 37 uses the estimated channel values to compensate for channel fluctuation of data symbols. Through the processing described above, transmission data from three users that was distributed to all of the subcarriers 1 to 31 shown in (A) of FIG. 18 is demodulated. After that, the demodulated subcarrier signals 1 to 31 (not shown in the figure) are converted to serial data and decoded for each band.

Guard Band

When the OFDMA access method is applied to a downlink communication, after the band that is assigned to each of the mobile stations is selected by a reception filter (low pass filter 6e shown in FIG. 20) having characteristic A as shown in (A) of FIG. 25, a receiver (FFT, channel compensation unit, etc.) having a specified bandwidth performs reception processing. At this time, orthogonality between subcarriers is lost due to the waveforms of the subcarriers are distorted in a sloped area A' of the band 2 which is restricted by the reception filter, and there is a problem in that the interference component is leaked into the regions of the bands.

Therefore, as shown in (B) of FIG. 25, the effect of the interference described above is removed by placing guard bands (subcarriers 10, 11; 21, 22) at the boundaries of the bands, and by not using the subcarriers of those areas for data transmission. A method for extracting band 2 with a reception filter at a mobile station is shown in (C) of FIG. 25. As shown in (C) of FIG. 25, by performing design so that sloped portion of the reception filter comes into the guard band region, it is possible to eliminate the effect of interference due to waveform distortion. In the case of using a reception filter having wide passband characteristic as shown in (A) of FIG. 25 as well, a comparatively large interference component is generated in the guard band region, so it is possible to prevent the effect of the interference component leaking into the band.

On the other hand, when OFDMA is applied to an uplink communication (communication from a mobile station to the base station), the base station receives a plurality of bands all together and performs OFDM signal processing. Generally, as shown in FIG. 21, in OFDM, by inserting a guard interval GI by copying the last part of the signal waveform and adding it to the start of the OFDM symbol, orthogonality between subcarriers can be maintained even when receiving signals such multipath signals or signals for other users having different reception timing. This will be simply explained using FIG. 26. The FFT timing synchronization unit 33 (see FIG. 24) of the base station measures the reception timing (FFT timing) of signals from a plurality of users that are received at the same time, and the symbol extraction unit 34 determines the symbol position based upon the earliest FFT timing and from the received signals extracts symbols from which the guard interval has been removed (the main wave of user 1 in the example shown in FIG. 26) and performs FFT processing. When doing this, in the case that signals from all users including guard intervals, are included in the extracted symbol, orthogonality between subcarriers can be maintained depending on the nature of FFT. However, in an uplink, the timing at which signals arrive at the base station differs greatly for each user due to the distance between the base station and mobile stations and the propagation state, so the difference in reception timing may exceed the guard interval, and thus a state occurs in which orthogonality between subcarriers is lost. In this case, by inserting guard bands as shown in (B) of FIG. 25, it is possible to reduce the effect of interference due to the loss of orthogonality between subcarriers of adjacent bands.

Also, in mobile communication, offset in carrier frequency occurs due to small shifts in the reference frequencies of the base station and mobile station. Normally, in a mobile station, the offset in carrier frequency is compensated by AFC (Automatic Frequency Control), however, since the performance of the AFC differs depending on the mobile station, the frequency offset that cannot be completed compensated for by AFC differs for each user. For example, it is known that when the amount of frequency offset reaches about 10% of the gap between subcarrier frequencies, the transfer properties greatly deteriorate due to the effect of interference between subcarriers. In this kind of case, by inserting guard bands as shown in (B) of FIG. 25, it is possible to reduce the effect of interference from bands assigned to users having poor AFC performance.

PROBLEMS TO BE SOLVED BY THE INVENTION

As described above, in a cellular mobile communication system that uses OFDMA, by inserting guard bands, it is possible to reduce the effect of interference between bands due to a loss of orthogonality between subcarriers. However, inserting a guard band means inserting a region that is not used for communication, so there is a problem in that the frequency utilization efficiency decreases by the amount of that region. In order to increase the frequency utilization efficiency, it is necessary to use all of the subcarriers for data transmission without inserting guard bands, however, as was described above, due to the effect of the reception filter, or due to effects such as the difference in reception power, difference in timing, difference in frequency offset between bands, and due to the effect of interference that is caused by a loss of orthogonality between subcarriers, there is a problem in that throughput is not increased, and it is not possible to improve the frequency utilization efficiency.

As prior art is a method of using subcarriers that are inserted in the guard band region for data transmission (See JP2002-319917A). However, this prior art merely provides a method of using the guard band region for data transmission when using two bands together as one band, and does not adaptively determines or not whether to use the guard band region for data transmission.

SUMMARY OF THE INVENTION

Taking the above into consideration, the object of the present invention is to adaptively determines whether or not to use a guard band region for data transmission, in order to improve the frequency utilization efficiency.

In an OFDM communication system that performs OFDM data communication by dividing a band region into a plurality of bands and assigning each band to a mobile station; a base station monitors transmission characteristics of the bands and state of use of adjacent bands; and sets whether to use or not use a guard band region on the boundary between bands for data transmission based on the transmission characteristics of the bands and the state of use of the adjacent bands.

For example, when performing downlink communication, the base station monitors DOWN transmission characteristic of specified bands reported from the mobile stations and state of use of the adjacent bands; and sets whether to use a guard band region on the boundary between bands for downlink data transmission based on the transmission characteristics of the bands and the state of use of adjacent bands. Also, the base station uses control data to notify mobile stations of how to use the guard band regions in the downlink communication.

Moreover, when performing uplink communication, a base station monitors transmission characteristics in uplink communication of bands and state of use of the adjacent bands; sets whether to use or not use a guard band region on the boundary between bands for uplink data transmission, based on the transmission characteristics of the bands and the state of use of the adjacent bands; and notifies the mobile stations of how to use the guard band region in that uplink communication.

A mobile station demodulates DOWN transmission data based on an instruction of control information regarding whether or not to use the guard band regions in down ink communication for data transmission. Also, the mobile station distributes UP transmission data to subcarriers of a specified band and performs transmission based on an instruction of control information regarding whether or not to use the guard band regions in uplink communication for data transmission.

With the present invention, it is possible to adaptively determines whether to use or not use the guard band regions for data transmission, and thus it is possible to improve the frequency utilization efficiency.

BRIEF DESCRIPTION OF THE DRAWINGS

FIG. 1 is a drawing that explains adaptive control of guard bands of the present invention.

FIG. 17 is a drawing explaining a frequency offset calculation unit.

FIG. 18 is a drawing showing the state of user division in a frequency domain in the OFDMA access method.

FIG. 25 is a drawing explaining the guard bands in the OFDMA access method.

Figure 2:
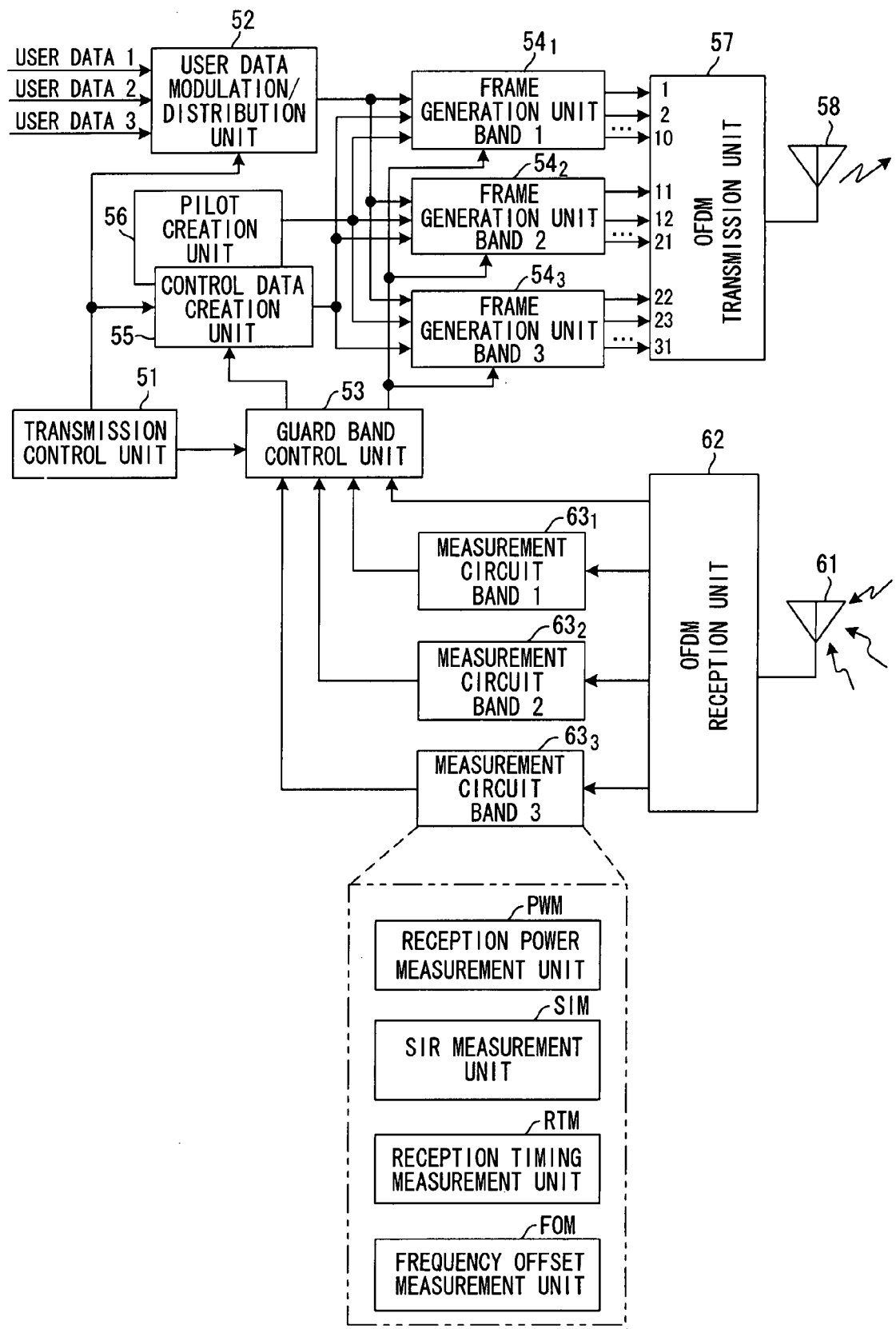
FIG. 2 is a drawing showing the construction of the base station apparatus of the present invention.

DESCRIPTION OF THE PREFERRED EMBODIMENTS (A) Overview of the Invention

Adaptable Control of Guard Bands

In OFDMA, depending on communication conditions such as reception power, reception timing, frequency offset, and the like, there may be cases in which guard bands are necessary, and cases in which guard bands are not necessary. In accordance with the communication conditions, the present invention uses the guard band regions (subcarriers 10, 11; 21, 22) for data transmission as shown in (A) of FIG. 1, or uses them as guard bands as shown in (B) and (C) of FIG. 1. By doing this, it is possible to improve the frequency utilization efficiency.

For example, a mobile station that performs data communication at a high transmission rate uses multi-value modulation such as 16 QAM or 64 QAM, or error-correction coding having a high coding rate. In that case, it becomes easy to receive the effect of interference due to a loss of orthogonality between subcarriers in the adjacent bands. Therefore, when performing data communication at a high transmission rate, guard bands are used in order to improve the transmission efficiency (see (B) of FIG. 1). On the other hand, a mobile station that performs data communication at a low transmission rate uses a modulation method such as BPSK or QPSK, or error-correction coding having a low coding rate. In that case, very little of the effect of interference due to a loss in orthogonality between subcarriers in adjacent bands is received. Therefore, during data communication having a low transmission rate, guard bands are not used, and the regions are used for data transmission in order to improve the transmission efficiency (see (A) of FIG. 1). By adaptively controlling whether or not to use the guard band regions for data transmission according to the transmission rate of the user, it is possible to improve the frequency utilization efficiency.

Adaptive Control of Guard Bands in a Downlink

When a base station respectively assigns bands to the signals for each of the users in a down ink and transmits data, the base station sets whether to use the guard band regions for data transmission, or to use them as guard bands and not for data transmission. Also, the base station uses a control channel to notify each of the mobile stations of whether or not data is assigned to the guard bands. With this kind of mechanism, it is possible to adaptively control how to use the guard bands. More specifically, the base station performs adaptive control of the guard bands as described below.

(1) When there is no user that is assigned to a band, the base station performs control to use the guard band regions on both ends of that band for data transmission of the adjacent bands.

(2) When a transmission rate that is higher than a preset transmission rate is applied to a band, the base station performs control so that the guard band regions on both ends of that band are used as guard bands and not for data transmission (see (B) of FIG. 1). In addition to the transmission rate, it is also possible to use the modulation method or coding rate as the judgment criterion.

(3) As a condition for setting how to use the guard bands, the base station can use feedback information from a mobile station. The mobile station uses pilot symbols that have been time multiplexed with each OFDM subcarrier and measures the reception power of the downlink, then uses the control channel of the uplink to feedback the reception power to the base station. The base station compares the reception power feedback for each of the bands, and when the difference in reception power between adjacent bands is greater than a preset threshold value, performs control to use the guard band region between those bands as a guard band, and not to use it for data transmission (see (C) of FIG. 1.

(4) Also, a mobile station uses pilot symbols that are time multiplexed with each of the OFDM subcarriers to measure the reception SIR (Signal to Interference Ratio) of the guard band region or near the guard band region, then sends the reception SIR to the base station as feedback. When the SIR feedback is less than a preset threshold value, the base station performs control to use the guard band region as a guard band and not for data transmission ((C) of FIG. 1). By comparing the measured SIR with the preset threshold value, it is also possible for the mobile station to decide the method for using the guard band, and send that method for using the guard band region to the base station.

Adaptive Control of Guard Bands in an Uplink

In an uplink, the base station decides how to use the guard band regions based on measured information, and uses the control channel of the downlink to notify the mobile stations of how to use the guard band regions. By using this kind of mechanism, it is possible to adaptively control the how to use the guard band regions. More specifically, the base station performs adaptive control of the guard bands as described below.

(1) When there is no user that is assigned to a band in the uplink, the base station notifies the mobile stations to use the guard band regions on both sides of that band for data transmission of the adjacent bands.

(2) The base station uses pilot symbols that are time multiplexed with each of the OFDM subcarriers to measure the reception power for each uplink band, and when the difference in reception power between adjacent bands is greater than a preset threshold value, the base station notifies the mobile stations to use the guard band region between the two bands as a guard band and not for data transmission ((C) of FIG. 1).

(3) When the transmission rate that is assigned to an uplink band is higher than a preset transmission rate, the base station notifies the mobile stations to use the guard band regions on both ends of that band as guard bands and not for data transmission ((B) of FIG. 1). In addition to the transmission rate, it is also possible to use the modulation method, or coding rate as the judgment criterion.

(4) The base station uses pilot symbols that are time multiplexed with each of the OFDM subcarriers to measure the reception SIR of a guard band region or near a guard band region, and when that value is less than a preset threshold value, notifies the mobile station to use that guard band region as a guard band and not for data transmission ((C) of FIG. 1).

(5) The base station uses pilot symbols that are time multiplexed with each of the OFDM subcarriers to measure the delay profile for each user of the uplink and acquires reception timing for each user. Also, the base station compares the difference in the reception timing of two adjacent bands with the length of the guard interval, and when the difference in timing is greater than a preset threshold value, notifies the mobile stations to use the guard band region between the two bands as a guard band and not for data transmission. ((C) of FIG. 1).

(6) The base station uses pilot symbols that are time multiplexed with each of the OFDM subcarriers and measures the amount of frequency offset for each user of the uplink. Also, the base station compares the difference in the frequency offsets of two adjacent bands with the subcarrier frequency interval, and when the difference in the frequency offsets is greater than a preset threshold value, the base station notifies the mobile stations to use the guard band region between two bands as a guard band and not for data transmission ((C) of FIG. 1).

(B) Embodiment (a) Base Station

FIG. 2 is a drawing showing the construction of the base station apparatus of the present invention, and as shown in FIG. 1, a region having 31 subcarriers are divided into three bands 1 to 3 having 10 subcarriers, 11 subcarriers and 10 subcarriers, respectively, and is of the case in which users 1, 2, 3 are assigned to each of the bands 1, 2, 3 to perform OFDM transmission.

A transmission control unit 51 sets the coding rate and modulation method for each user and inputs them to a user data modulation/distribution unit 52, guard band control unit 53 and control data creation unit 55. The user data modulation/distribution unit 52 encodes all of the user data by the coding rate that was instructed for each user by the transmission control unit 51, as well as modulates the user data according to the instructed modulation method (BPSK, QPSK, 16QAM) and distributes the data to the prescribed frame generation unit $54_1$ to $54_3$ of the corresponding band assigned to the user. On the other hand, the guard band control unit 53 notifies the frame generation units $54_1$ to $54_3$ and the control data creation unit 55 according to control described below, of how to use the guard band regions on both sides of each band when performing data transmission in the downlink, or in other words, whether to use or not use the guard band for data transmission.

The control data creation unit 55 creates data for notification of not only the coding rate and modulation method for each user, but also of how to use the guard bands of bands 1 to 3 for the downlink and uplink, and inputs the respective data to the frame generation units $54_1$ to $54_3$. Also, a pilot creation unit 56 creates pilots that correspond to each band, and inputs the pilots to the respective frame generation unit $54_1$ to $54_3$. At the timing shown in the frame format shown in FIG. 22, the frame generation units $54_1$ to $54_3$ distribute pilots control data and transmission data to specified subcarriers 1 to 31.

When instructed to use the guard band region (subcarrier 10) of band 1 as a guard band, the frame generation unit $54_1$ distributes the pilot symbol for band 1, the control data symbol for band 1 and the transmission data symbol for band 1 to subcarriers 1 to 9 according to the frame format, and when instructed that it is okay to use that guard band region for data transmission, distributes these symbols to subcarriers 1 to 10 according to the frame format.

When instructed to use the guard band regions (subcarriers 11, 21) of band 2 as guard bands, the frame generation unit $54_2$ distributes the pilot symbol for band 2, the control data symbol for band 2 and the transmission data symbol for band 2 to subcarriers 12 to 20 according to the frame format, and when instructed that it is okay to use those guard band regions for data transmission, distributes these symbols to subcarriers 11 to 21 according to the frame format. Moreover, when instructed to use one of the guard band regions (subcarrier 11) as a guard band, and that it is okay to use the other guard band region (subcarrier 21) for data transmission, the frame generation unit $54_2$ distributes the pilot symbol for band 2, the control data symbol for band 2 and the transmission data symbol for band 2 to subcarriers 12 to 21 according to the frame format.

When instructed to use the guard band region (subcarrier 22) of band 3 as a guard band, the frame generation unit $54_3$ distributes the pilot symbol for band 3, the control data symbol for band 3 and transmission data symbol for band 3 to subcarriers 23 to 31 according to the frame format, and when instructed that it is okay to use that guard band region for data transmission, distributes those symbols to subcarriers 22 to 31 according to the frame format.

Figure 3:
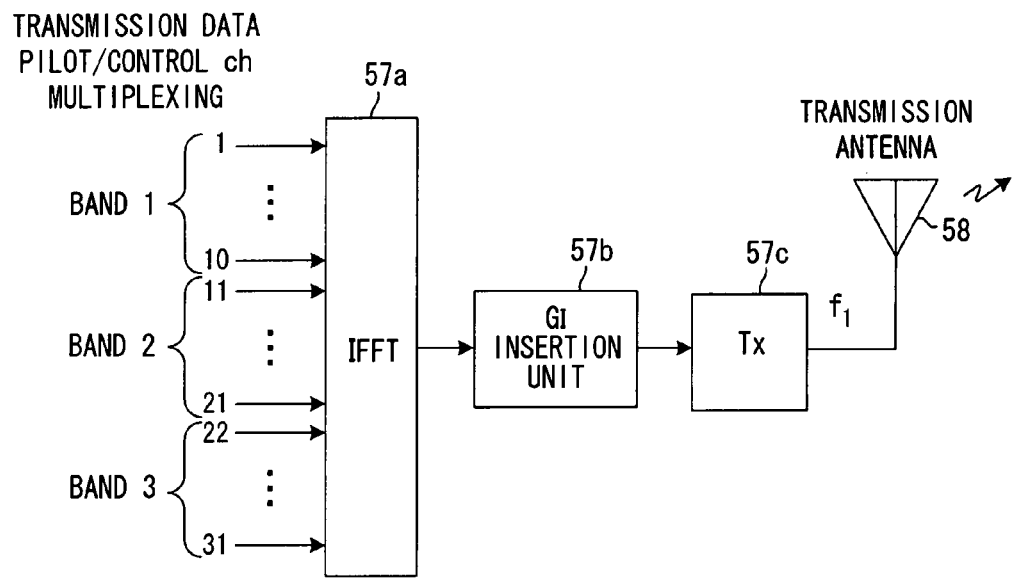
FIG. 3 is a drawing showing the construction of an OFDM transmission unit.
Figure 19:
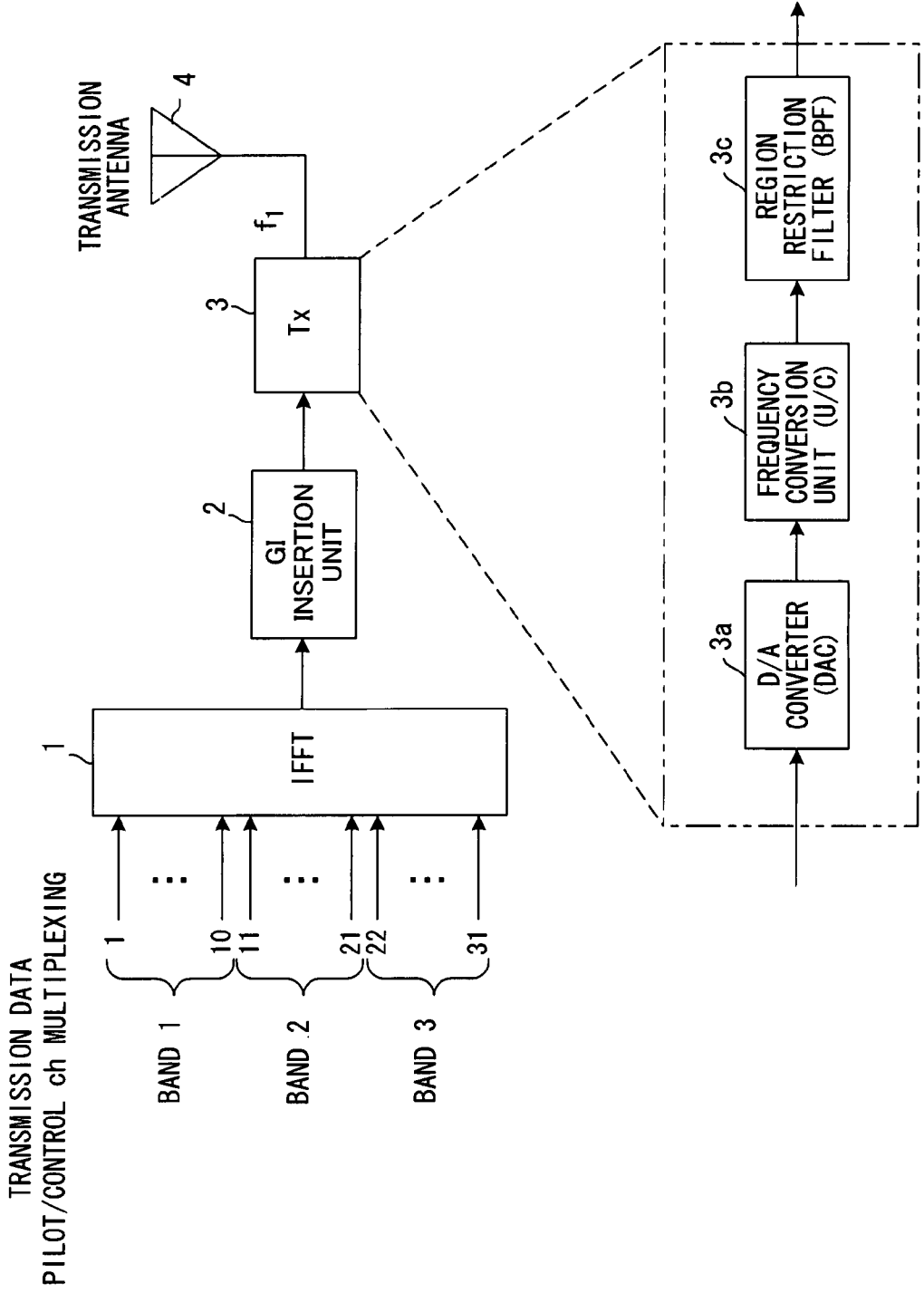
FIG. 19 is a drawing showing the construction of an OFDM transmission unit of a base station.

An OFDM transmission unit 57 has the construction shown in FIG. 3 and operates in the same way as was explained in FIG. 19. In other words, an IFFT unit 57a performs IFFT processing on the subcarrier signals 1 to 31 that are input from the frame generation units $54_1$ to $54_3$ and converts the signal to a time-domain signal, then a guard interval insertion unit 57b inserts guard intervals GI into the time-domain signal, and a transmission unit 57c converts the frequency of the baseband signal that is output from the guard interval insertion unit 57b to an RF signal having a center frequency f1 and the result is output from a transmission antenna 58.

Figure 4:
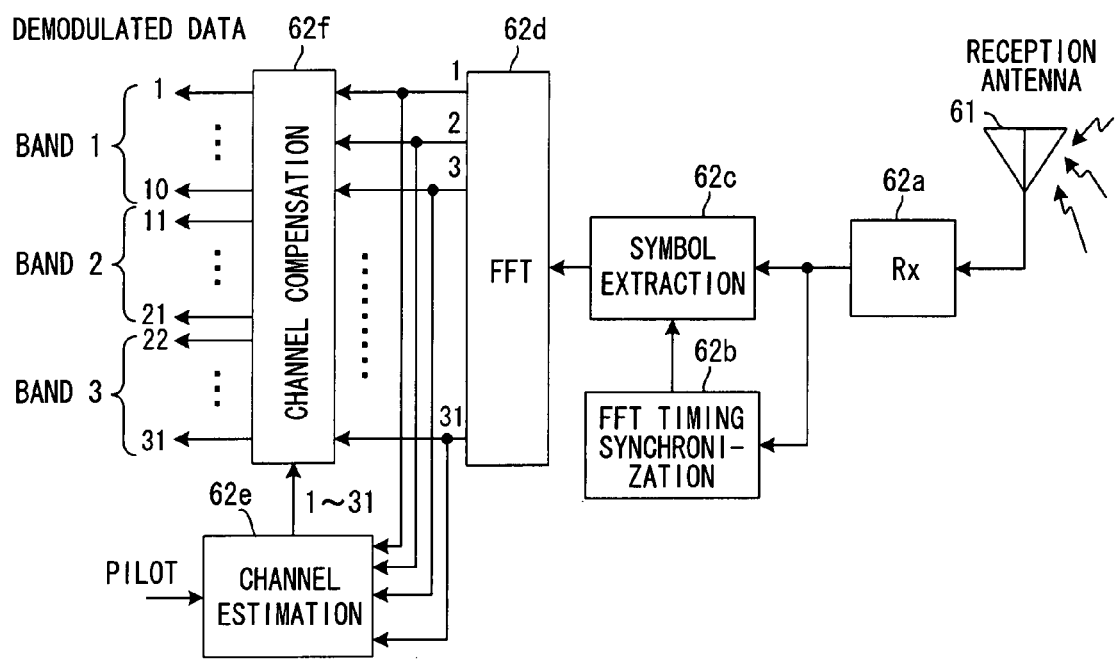
FIG. 4 is a drawing showing the construction of an OFDM reception unit.
Figure 24:
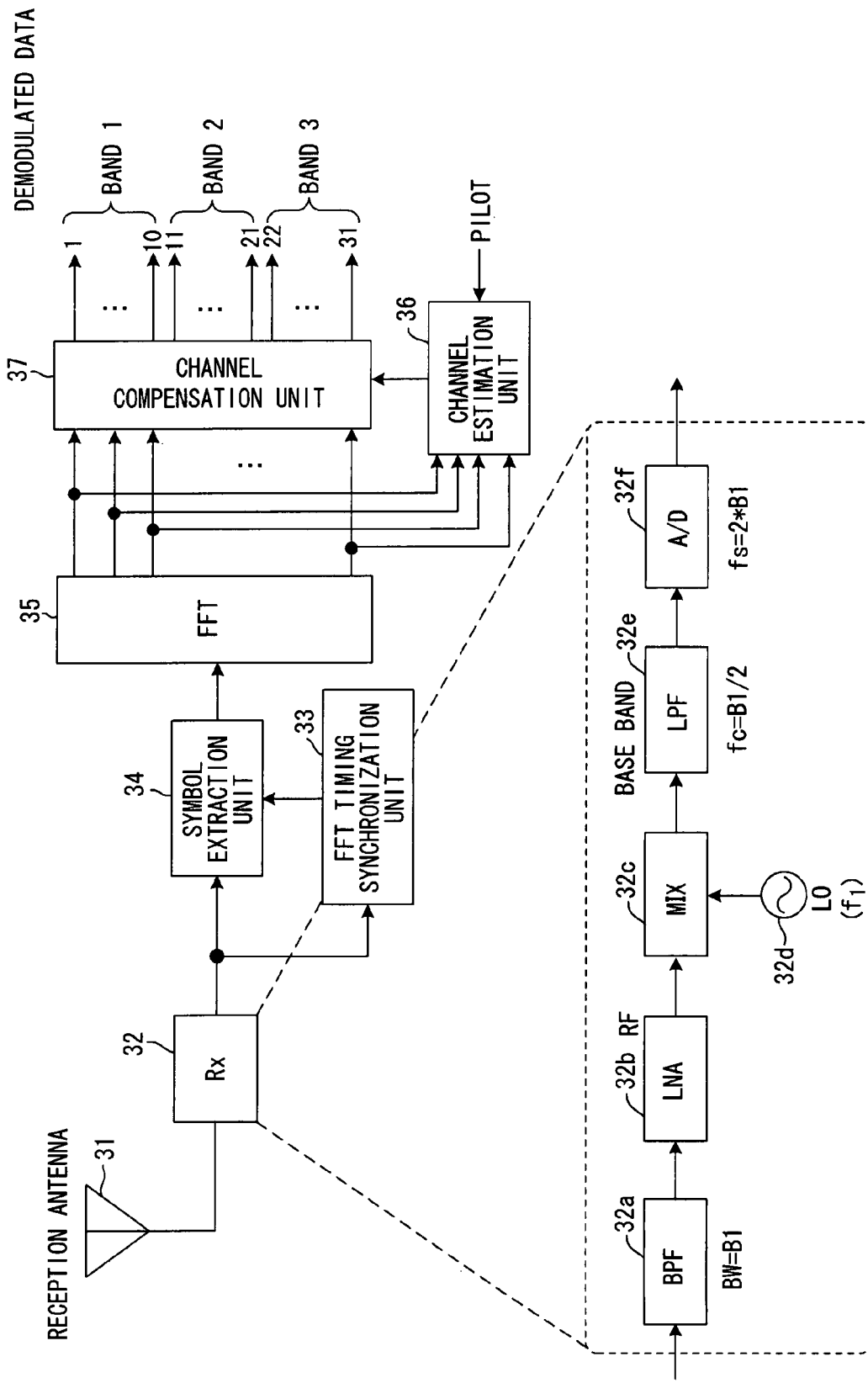
FIG. 24 is a drawing showing the construction of an OFDM reception unit of a base station.
Figure 26:
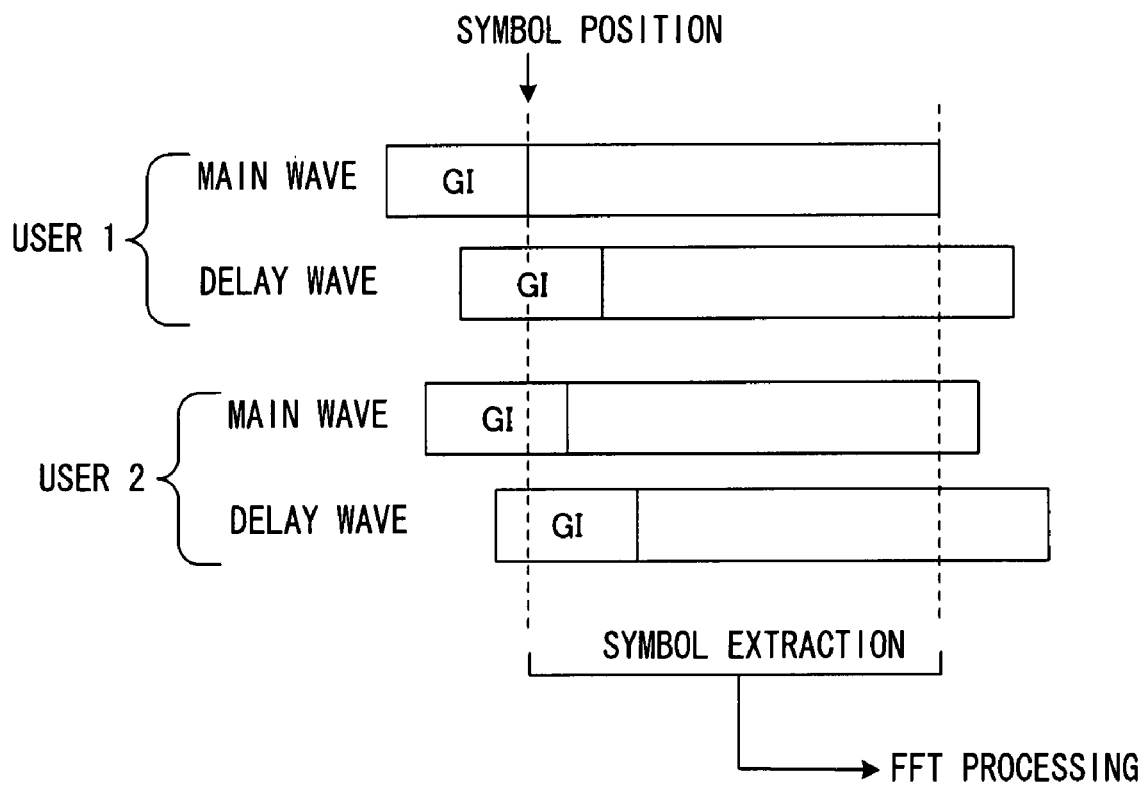
FIG. 26 is a drawing explaining a method of maintaining orthogonality between subcarriers.

Also, OFDM modulation signals that are transmitted from each mobile station travel over their respective propagation paths and are received by the reception antenna 61 of the base station and input to an OFDM reception unit 62. The OFDM reception 62 has the construction shown in FIG. 4, and operates in the same way as that explained in FIG. 24. In other words, a reception circuit 62a converts the RF signal to a baseband signal, a FFT timing synchronization circuit 62b detects the FFT timing from the time-domain signal that is output from the reception circuit 62a and that includes signals for each band, and a symbol extraction unit 62c extracts the symbols at that FFT timing and inputs the result to a FFT unit 62d. The FFT unit 62d performs FFT processing for each of the extracted symbols, and converts the result to subcarrier signals 1 to 31 in the frequency domain. A channel estimation circuit 62e performs channel estimation for each subcarrier by calculating the correlation between the pilot symbols that are received at fixed intervals and a well-known pilot pattern, and a channel compensation circuit 62f uses the channel estimation values to compensate for channel fluctuation of the data symbols.

Figure 5:
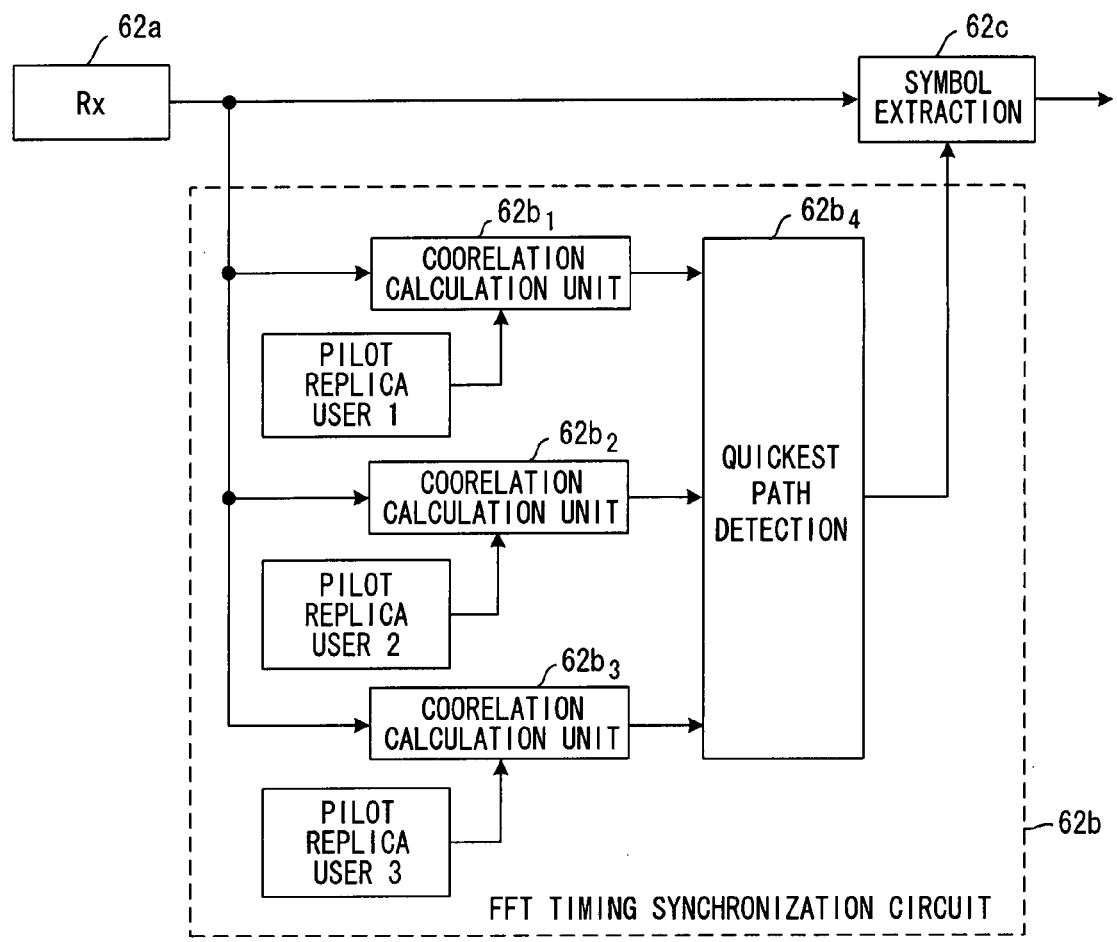
FIG. 5 is a drawing showing the construction of an FFT timing synchronization circuit.
Figure 6:
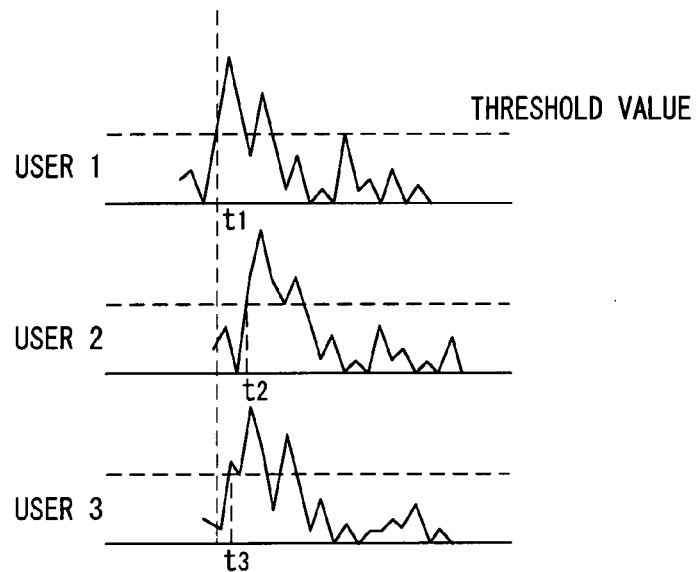
FIG. 6 is a drawing showing the waveform of a delay profile.

FIG. 5 shows the construction of the FFT timing synchronization circuit 62b which comprises: correlation calculation units $62b_1$ to $62b_3$ that calculate the correlation between the received signals and pilot symbol replicas (known), and a quickest path detection unit $62b_4$ that detects the quickest path from bands 1 to 3. This FFT timing synchronization circuit 62b calculates delay profiles (see FIG. 6) for each user from the correlation calculation between the pilot symbol replicas for each user and the received signals, and from those profiles detects the timing of the quickest path, or in other words, detects the first timing of the timing t1 to t3 at which each of the delay profiles becomes greater than a threshold value, and inputs the detected timing to the symbol extraction unit 62c as the FFT timing.

Returning to FIG. 2, the OFDM reception unit 62 demodulates downlink transmission characteristic data that is sent from mobile stations by way of the control channels and inputs the result to the guard band control unit 53, as well as inputs estimated channel values for subcarriers 1 to 31 and delay profiles (see FIG. 6) to measurement circuits $63_1$ to $63_3$ for bands 1 to 3. As the downlink transmission characteristic there is the DOWN reception power and reception SIR of the guard band regions or of subcarriers nearby the guard band regions.

The measurement circuits $63_1$ to $63_3$ for each of the bands measure the transmission characteristics of the bands 1 to 3 in the uplink and input the results to the guard band control unit 53. In other words, the measurement circuits $63_1$ to $63_3$ comprise: a reception power measurement unit PWM that measures the uplink reception power of each band; an SIR measurement unit SIM that measures the reception SIR of the subcarriers near the guard bands regions of each band; a reception timing measurement unit RTM that measures symbol reception timing of each band, and a frequency offset measurement unit FOM that measures the frequency offset of each band, and they input the measured uplink reception power, uplink reception SIR, reception timing and frequency offset to the guard band control unit 53. The construction of each measurement unit will be described later.

Based on the state of use of the bands that is input from the transmission control unit 51, the transmission characteristics of the uplinks that are input from each of the measurement circuits $63_1$ to $63_3$, and the transmission characteristics of the downlinks that are input from the OFDM reception unit 62, the guard band control unit 53 decides whether or not it is okay to use the guard band regions on both sides of each band during DOWN data transmission or update transmission, in other words, decides whether or not guard bands should be placed on both sides of a band, and notifies the frame generation units $54_1$ to $54_3$ and control data creation units 55 of the decision results.

(b) Process for Setting how to Use Guard Band

Figure 7:
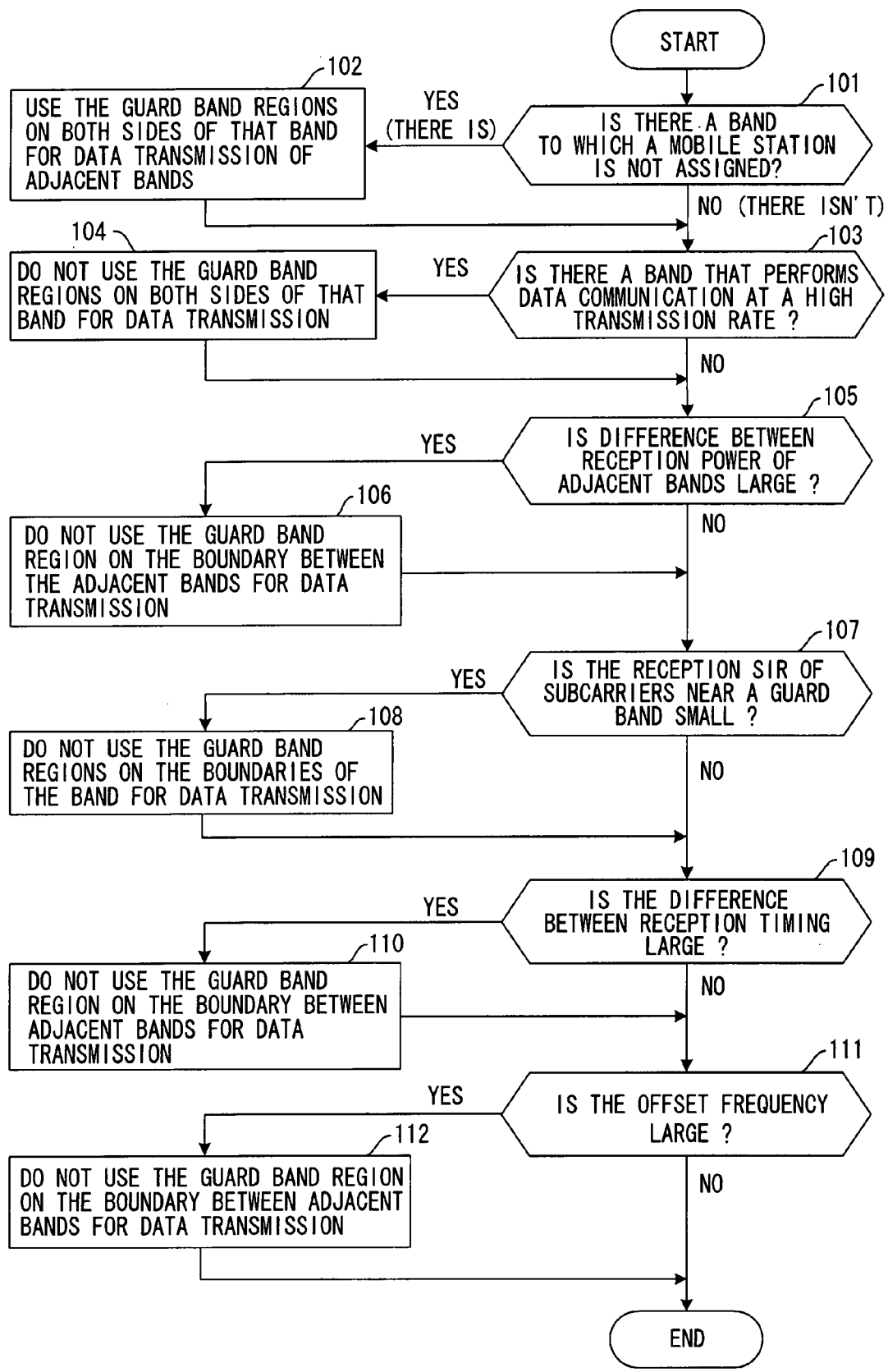
FIG. 7 is a flowchart showing the processing performed by the guard band control unit for setting the method of using guard bands in an uplink.

FIG. 7 is a flowchart of the process that is performed by the guard band control unit 53 to set how to use the guard band in the uplink.

The guard band control unit 53 determines whether users (mobile stations) are assigned to each of the bands (step 101), and when there is band for which a user is not assigned, sets to use the guard band regions on both sides of that band to be used for data transmission of the adjacent bands (step 102). Referring to (B) of FIG. 1, the guard regions are subcarriers 10, 11 and 21, 22. For example, in the case in which no user is assigned to band 2, the guard band control unit 53 sets to use subcarrier 10 for data transmission of band 1, and sets to use subcarrier 22 for data transmission of band 3.

Next, the guard band control unit 53 makes a reference to the transmission rate, modulation method or coding rate and checks whether there is a band that performs data communication at a high transmission rate (step 103). There is such a band, the guard band control unit 53 sets not to use the guard band regions on both sides of that band for data transmission (step 104). For example, in the case where the transmission rate of band 2 is high, the guard band control unit 53 sets not to use subcarrier 10 for data transmission for band 1, sets not to use subcarriers 11, 21 for data transmission for band 2, and sets not to use subcarrier 22 for data transmission for band 3.

Next, the guard band control unit 53 compares the uplink reception power of each band, and checks whether there is a large difference between reception power of any adjacent bands (step 105), and when there is, sets not to use the subcarriers of the guard band region on the boundary between those adjacent bands for data transmission (step 106).

After the judgment processing of steps 105, 106 has been completed, the guard band control unit 53 checks whether the reception SIR of the guard band regions of each band in the uplink is large (step 107), and when it is large, sets to use the subcarriers near that guard band region for data transmission, and when it small, sets to use the guard band region as a guard band (step 108).

Next, the guard band control unit 53 checks whether the difference between reception timing of adjacent bands in the uplink is greater than a preset threshold value (step 109), and when the difference is greater, sets not to use the guard band region on the boundary between the adjacent bands for data transmission (step 110).

Finally, the guard band control unit 53 checks whether the difference between frequency offset of adjacent bands in the uplink is greater than a preset threshold value (step 111), and when the difference is greater, sets not to use the guard band region on the boundary between the adjacent bands for data transmission (step 112), then ends processing. After that, the guard band control unit 53 repeats the above process for each frame.

Figure 8:
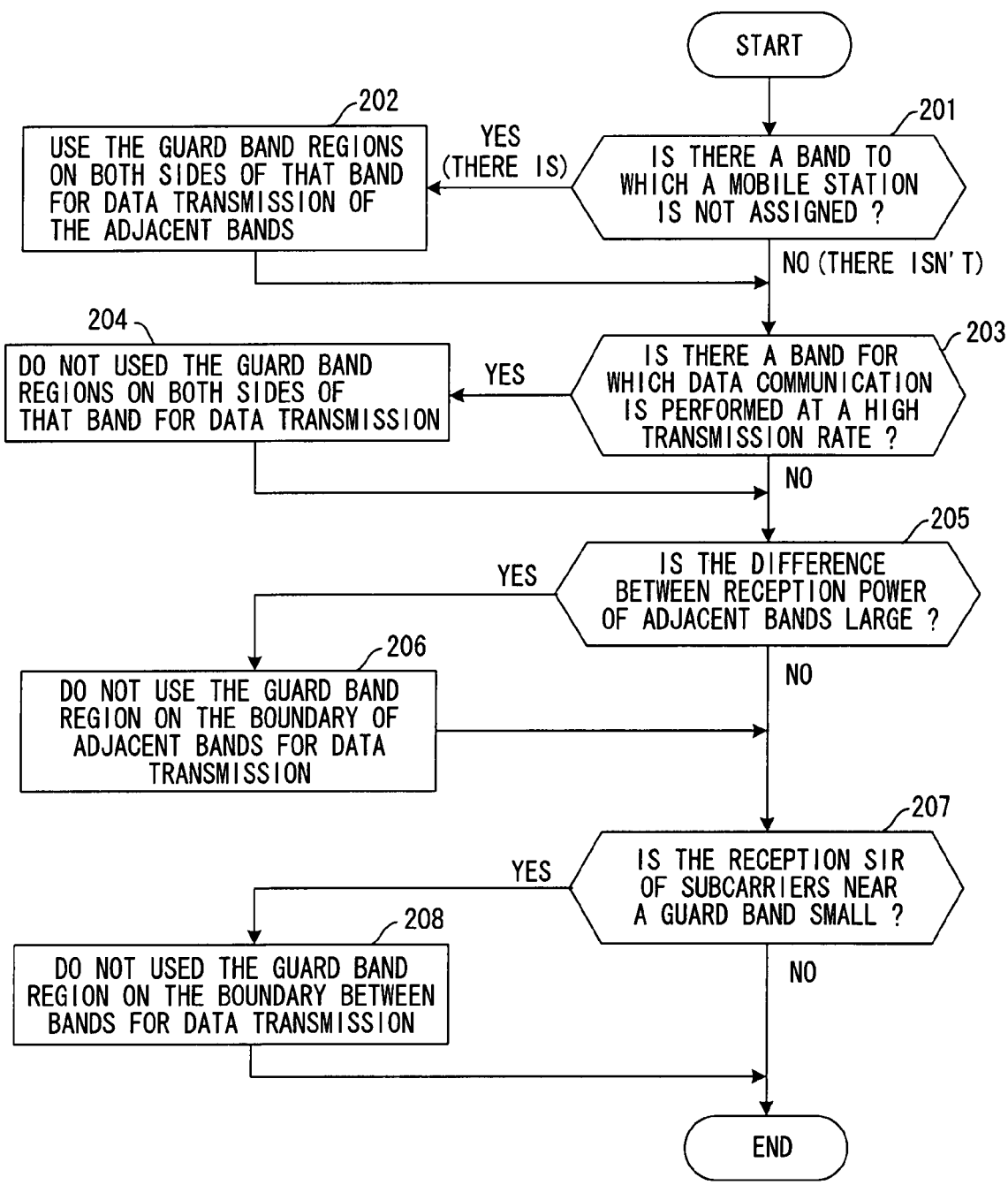
FIG. 8 is a flowchart showing the processing performed by the guard band control unit for setting the method of using guard bands in a downlink.

FIG. 8 is a flowchart of the process that is performed by the guard band control unit 53 to set how to use guard bands in the downlink, where steps 201 to 204 are the same as steps 101 to 104 shown in FIG. 7.

After the process of steps 203, 204 has been completed, the guard band control unit 53 compares the DOWN reception power that is included in notification information (feedback) from each mobile station, and checks whether there is a difference in reception power of any adjacent bands that is large (step 205), and when there is such a difference, sets not to use the subcarriers of the guard band region on the boundary between the adjacent bands (step 206).

Next, the guard band control unit 53 checks whether the reception SIR near the guard band region of each band in the downlink that is included in the notification feedback information from each mobile station is large (step 207), and when the reception SIR is large, sets to use the subcarriers of that guard band region for data transmission, and when the reception SIR is small, sets to use that guard band region as a guard band (step 208). After that, the guard band control unit 53 repeats the process above for each frame.

(c) Mobile Station

Figure 9:
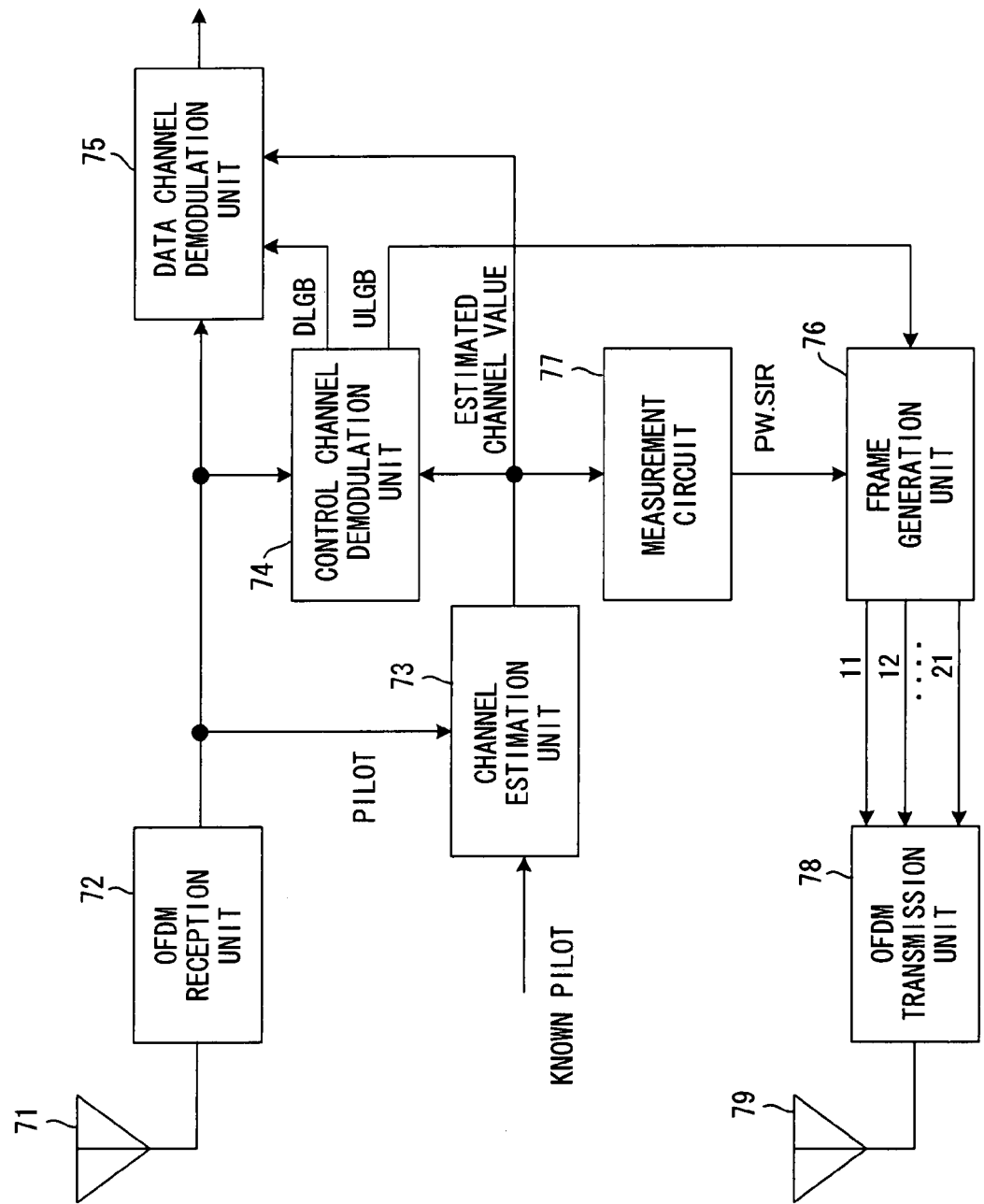
FIG. 9 is a drawing showing the construction of a mobile station.

FIG. 9 is a drawing showing the construction of a mobile station, and is the mobile station to which band 2 is assigned.

A signal that is transmitted from the base station passes over a fading propagation path, and is received by the reception antenna 71 of the mobile station, then the received signal is input to an OFDM reception unit 72.

Figure 10:
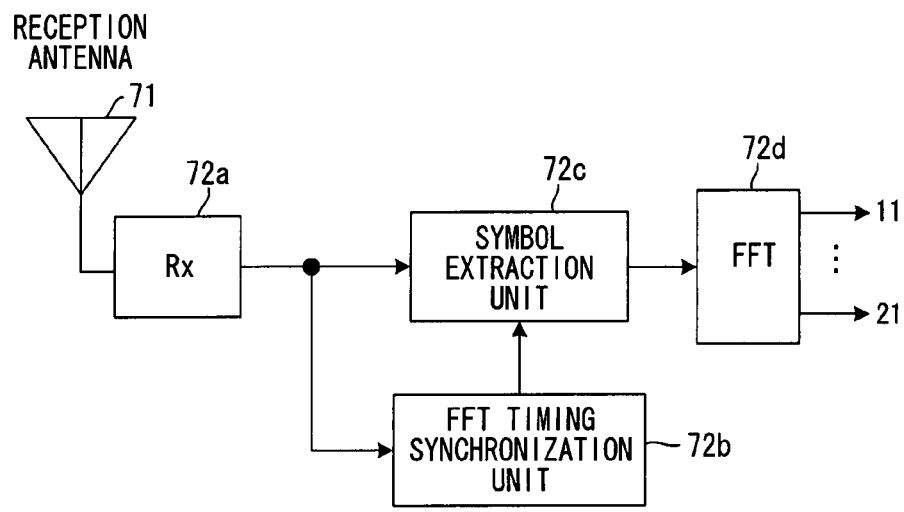
FIG. 10 is a drawing showing an example of the construction of an OFDM reception unit of a mobile station.
Figure 20:
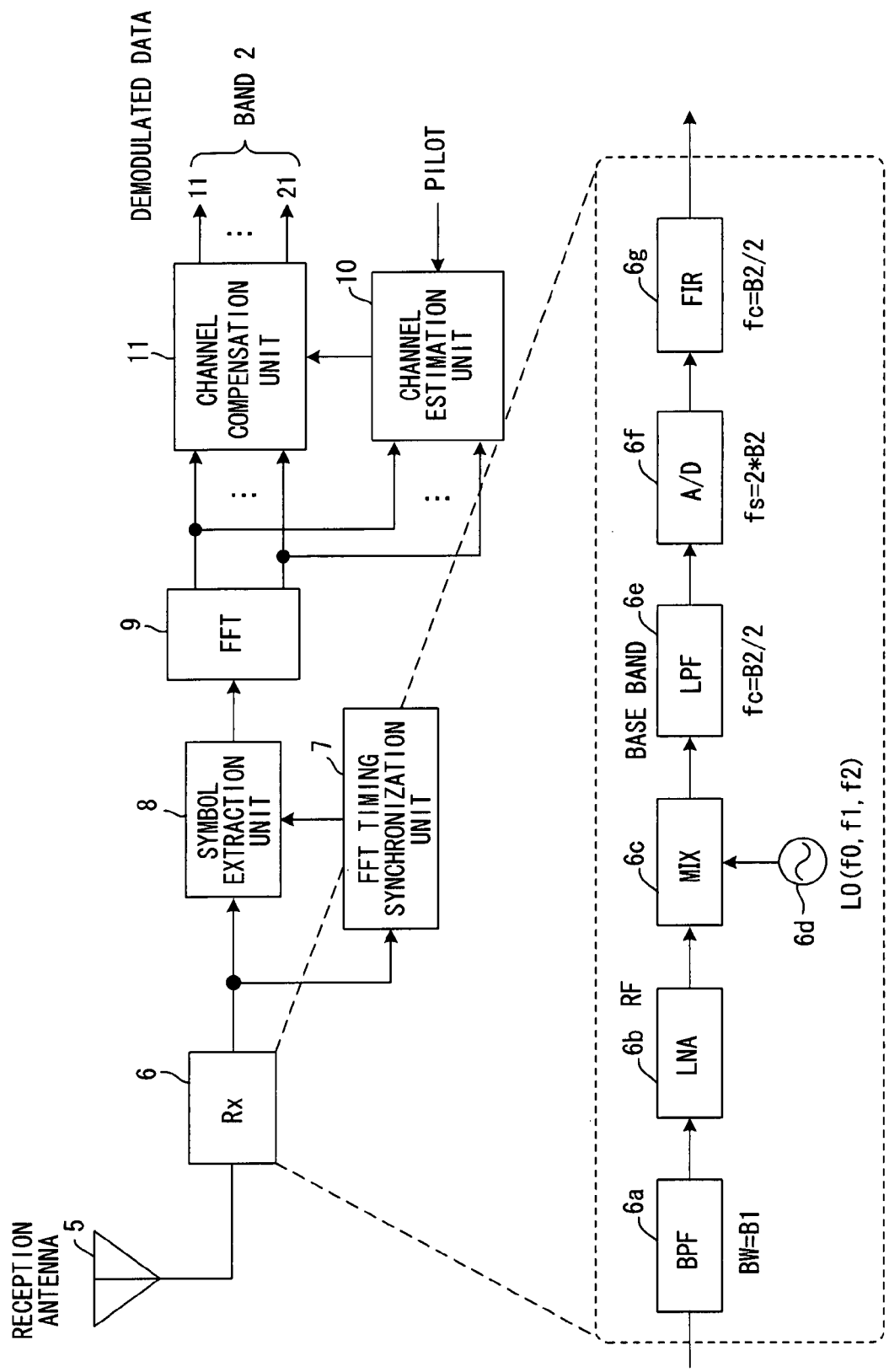
FIG. 20 is a drawing showing the construction of an OFDM reception unit of a mobile station.
Figure 21:
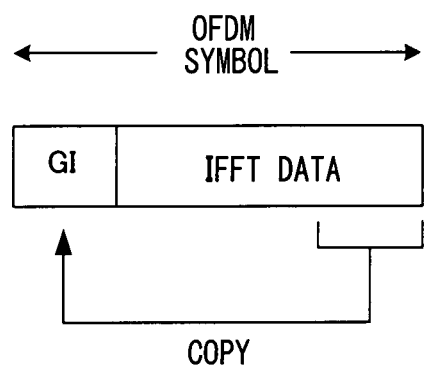
FIG. 21 is a drawing explaining a guard interval GI.

The OFDM reception unit 72 has the construction shown in FIG. 10, and performs the same operation as that shown in FIG. 20. In other words, a reception circuit (Rx) 72a outputs the baseband signal of band 2, for example, from the RF signal that is received by the antenna 71. A FFT timing synchronization circuit 72b detects the FFT timing from a time-domain signal that includes the signal of band 2 that is output from the reception circuit 72a, and a symbol extraction unit 72c extracts the symbols at that FFT timing. A FFT unit 72d performs FFT processing for each extracted symbol, and converts the signal to subcarrier signals 11 to 21, which are frequency-domain signals of band 2.

Returning to FIG. 9, a channel estimation circuit 73 performs channel estimation for subchannels 11 to 21 by calculating the correlation between the pilot symbols that are received at fixed intervals and a well-known pilot pattern, and a control channel demodulation unit 74 uses the estimated channel values and demodulates the control channel, finds how to use the guard band for bands (the method of guard band use for band 2) in the downlink and uplink, notifies a data channel demodulation unit 75 of the method of guard band use in the downlink by the DLGB signal, and notifies a frame generation unit 76 of the method of guard band use in the uplink by the ULGB signal.

The data channel demodulation unit 75 uses the estimated channel values and demodulates the data channel, then outputs demodulated data based on the signal DLGB which shows the method of guard band use in the downlink. For example, when the subcarriers 11, 21 of the guard band regions are used as guard bands, the data channel demodulation unit 75 outputs demodulated data of subcarriers 12 to 20, and when the subcarriers 11, 21 are used for data transmission, outputs demodulated data of subcarriers 11 to 21.

A measurement circuit 77 uses the estimated channel values and measures the downlink reception power PW and the reception SIR of the guard band region or subcarriers near the guard band region, then inputs them to a frame generation unit 76.

Figure 22:
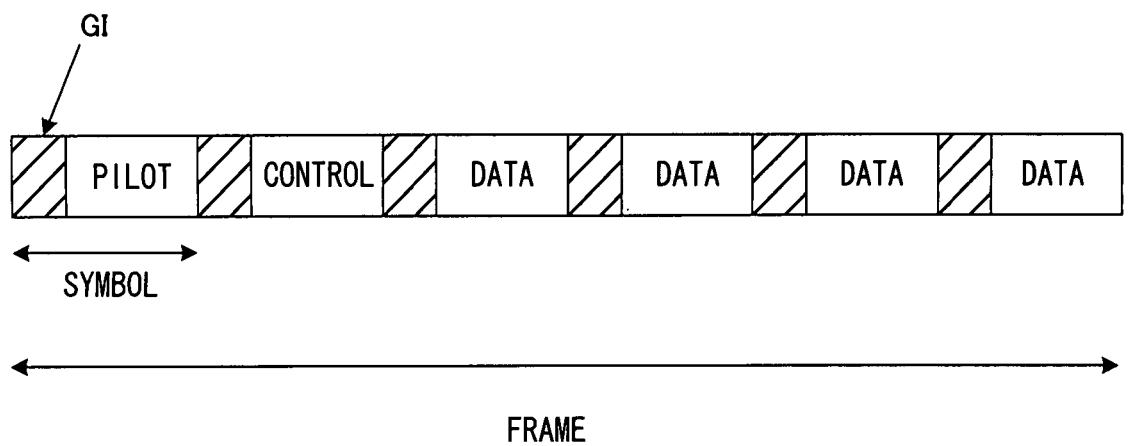
FIG. 22 is a drawing explaining frame format.
Figure 23:
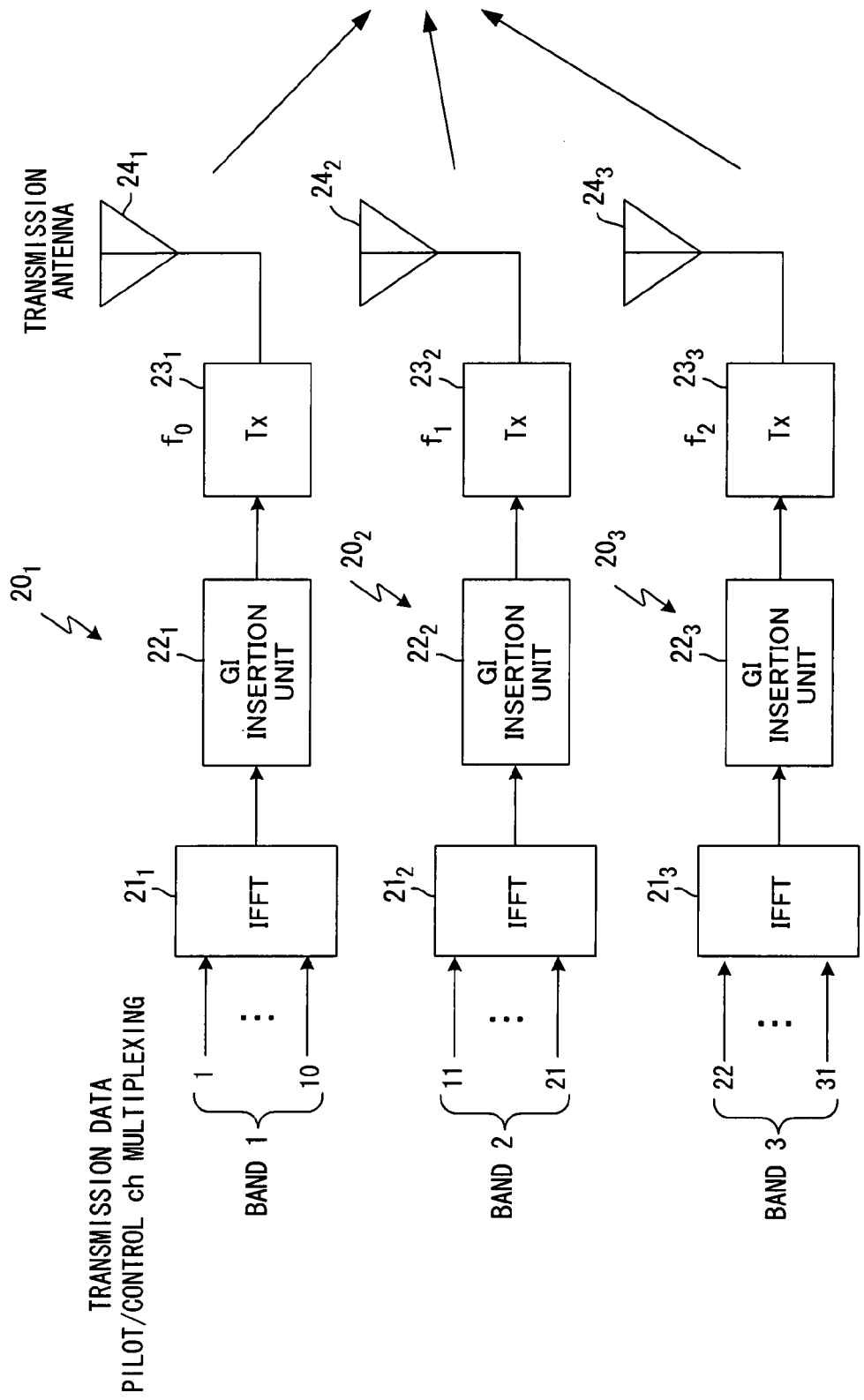
FIG. 23 is a drawing showing the construction of an OFDM transmission unit of a mobile station.

Based on the signal ULGB which shows the method of guard band use in the uplink that was notified from the control channel demodulation unit 74, the frame generation unit 76 distributes pilot symbols, control data symbols that include the downlink reception power PW and reception SIR and transmission data symbols to the subcarriers 11 to 21 of band 2 according to the frame format shown in FIG. 22, and inputs them to the OFDM transmission unit 78.

Figure 11:
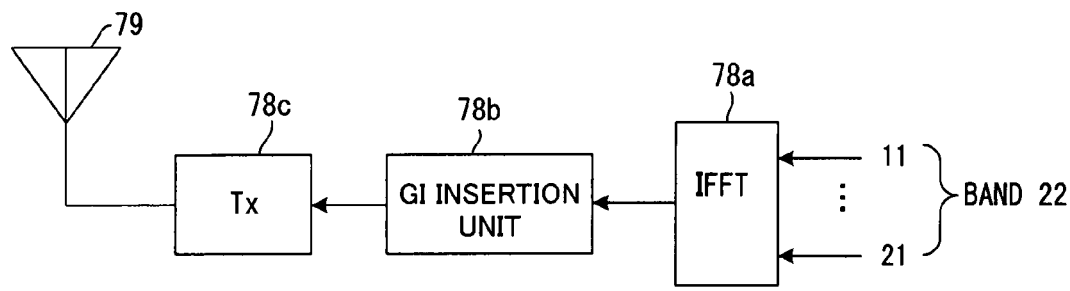
FIG. 11 is a drawing showing an example of the construction of an OFDM transmission unit of a mobile station.

The OFDM transmission unit 78 has the construction shown in FIG. 11. An IFFT unit 78a performs IFFT processing of subcarrier signals 11 to 21 and converts the signals to a time-domain signal, then a guard interval insertion unit 78b inserts guard intervals into the time-domain signal, and a transmission circuit (Tx) 78c converts the input signal to a radio signal and restricts the band, after which it amplifies the signal and transmits it from a transmission antenna 79.

(d) Measurement Circuit

Figure 12:
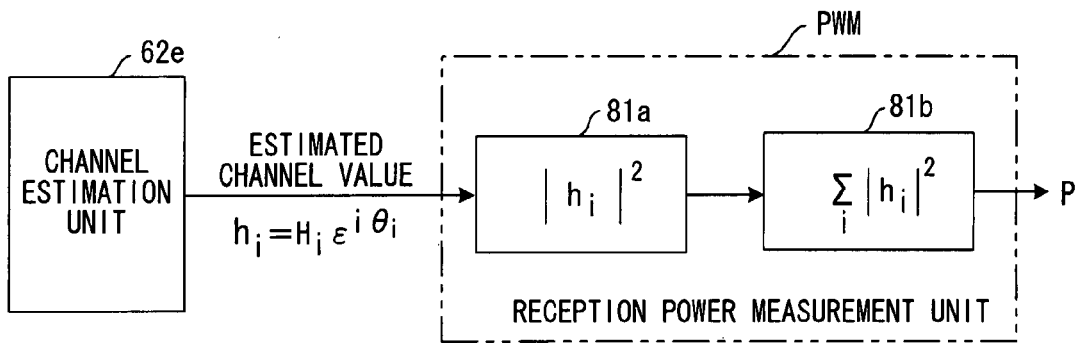
FIG. 12 is a drawing showing the construction of a reception power measurement unit.

FIG. 12 is a drawing showing the construction of the reception power measurement unit PWM shown in FIG. 2, which can also be used for the reception power measurement of the measurement circuit 77 in FIG. 9.

The channel estimation unit 62e outputs estimated channel values for the number of subcarriers that make up a band, $$h_i = H_i \times \exp(j\theta_i) \ (i=1 \text{ to } n)$$

and a power calculation unit 81a calculates the power of each subcarrier from the square of the amplitude $|hi|^2$, and calculates the total output power of the band according to Equation (1) below.

$$P = \Sigma_i |hi|^2 \ (i=1 \text{ to } n) \tag{1}$$

Figure 13:
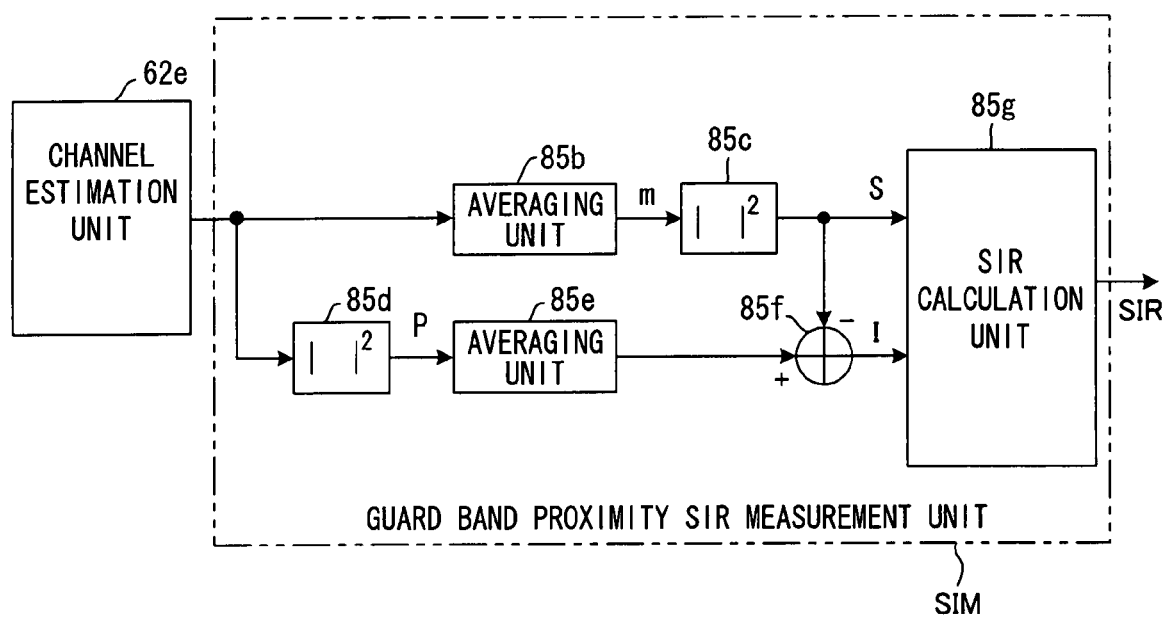
FIG. 13 is a drawing showing the construction of an SIR measurement unit.

FIG. 13 is a drawing showing the construction of the SIR measurement unit SIM shown in FIG. 2, which can also be used for the guard band proximity SIR measurement by the measurement unit 77 in FIG. 9.

An average calculation unit 85b calculates the average value m of the subcarriers for N number of symbols, and a desired wave power calculation unit 85c calculates $m^2$ (power S of the desired signal) by calculating the square of the I and Q axis components of the average value m. The reception power calculation unit 85d calculates the reception power P by calculating the square of the I axis component $H_I$, and Q axis component $H_Q$ of the subcarrier signal, or in other words, from the equation $P = H_I^2 + H_Q^2$, an average value calculation unit 85e calculates the average value of the reception power, a subtractor unit 85f subtracts $m^2$ (desired wave power S) from the average value of the reception power and outputs the interference wave power I, and a SIR calculation unit 85g calculates the SIR from Equation (2) below according to the desired wave power S and interference wave power I.

$$\text{SIR} = S/I \tag{2}$$

When the input signal that includes the desired signal and interference wave is taken to be xi (i=1, 2, ..., N), the average value m of the input signal can be expressed by the equation $$m = (1/N) \cdot \Sigma xi \ (i=1, 2, \ldots, N),$$

and the square of the average value m become the desired wave power S. On the other hand, the average value (variance) $\sigma^2$ of the square of the difference between the input signal and average value is the interference wave power I, and can be expressed by the equation below.

$$\sigma^2 = (1/N) \cdot \Sigma (xi - m)^2 \ (i=1, 2, \ldots, N)$$

By transforming the above equation, $\sigma^2$ can be expressed by Equation (3) below.

$$\begin{aligned}\sigma_2 &= (1/N) \cdot \sum |xi|^2 - (2m/N) \cdot \sum xi + (1/N) \cdot \sum m^2 \\ &= (1/N) \cdot \sum |xi|^2 - 2m^2 + m^2 \\ &= [(1/N) \cdot \sum |xi|^2] - m^2\end{aligned} \tag{3}$$

Therefore, the reception power calculation unit 85d and the average value calculation unit 85e perform calculation of the first term on the right side of Equation (3), the subtractor 85f subtracts $m^2$ (desired wave power S) from the output of the average value calculation unit 85e to calculate the interference wave power I, and the SIR calculation unit 85g executes the calculation of Equation (2).

Figure 14:
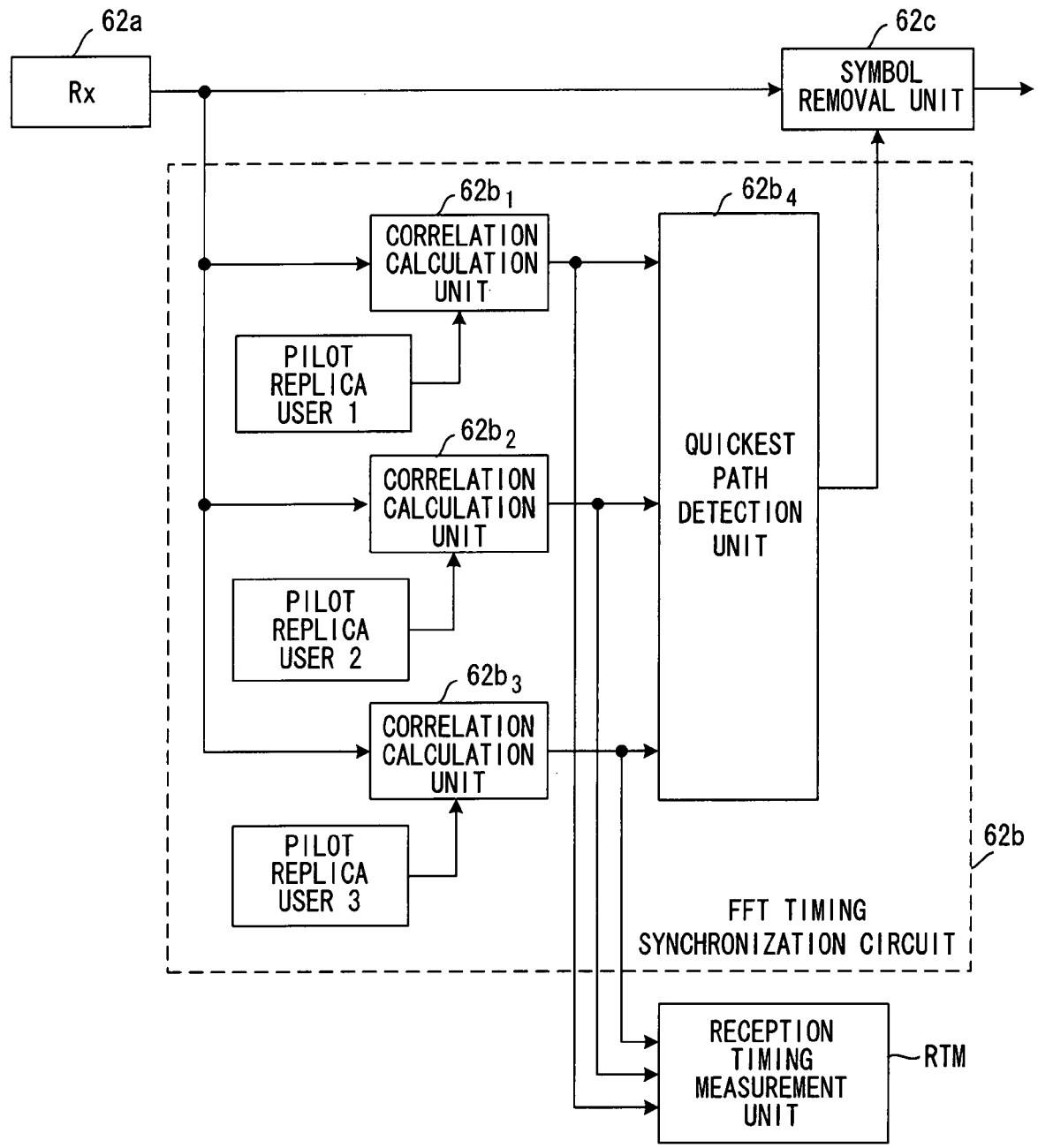
FIG. 14 is a drawing explaining a reception timing measurement unit.

FIG. 14 is a drawing for explaining the reception timing measurement unit RTM shown in FIG. 2, where the same reference numbers are used for parts having the same construction as shown in FIG. 5. The delay profiles that are output from the correlation calculation units $62b_1$ to $62b_3$ of the FFT timing synchronization circuit 62b are input to the reception timing measurement unit RTM, after which it measures the rise timing t1 to t3 at which each of the delay profiles becomes greater than a threshold value as the reception timing from each user (see FIG. 6).

Figure 15:
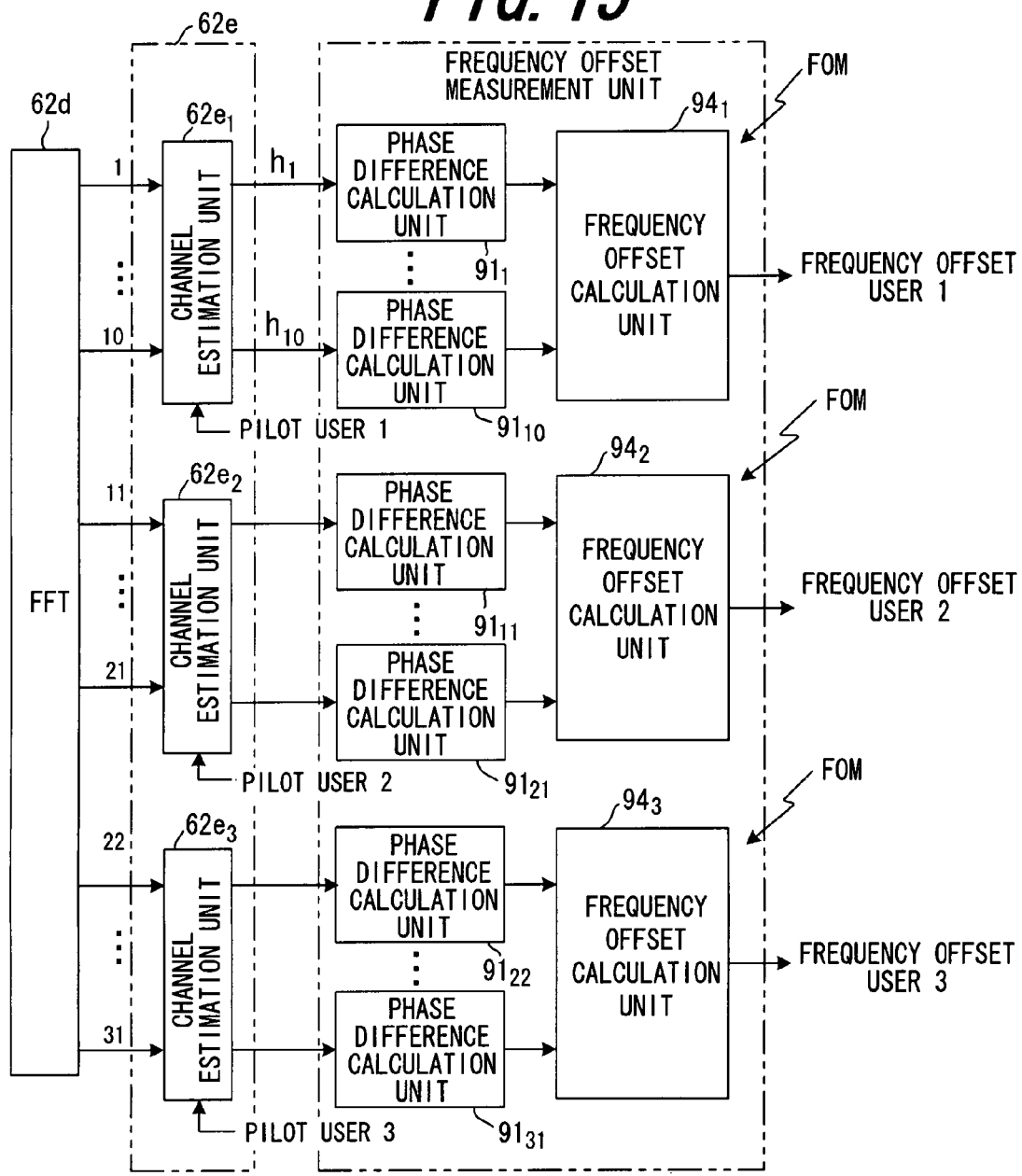
FIG. 15 is drawing showing the construction of a frequency offset measurement unit.

FIG. 15 is a drawing showing the construction of the frequency offset measurement unit FOM shown in FIG. 2, where a frequency offset measurement unit FOM is shown for each band 1 to 3. The frequency offset measurement units for each of the bands calculate the amount of phase change of the estimated channel values $h_n$ for each subcarrier and finds the amount of frequency offset $f_{\textit{offset}}$ from the average value. The subcarriers for each user are set, so it is possible to find the amount of frequency offset for each user. The construction of the frequency offset measurement units for each band is the same, so frequency offset measurement for band 1 will be explained here.

Figure 16:
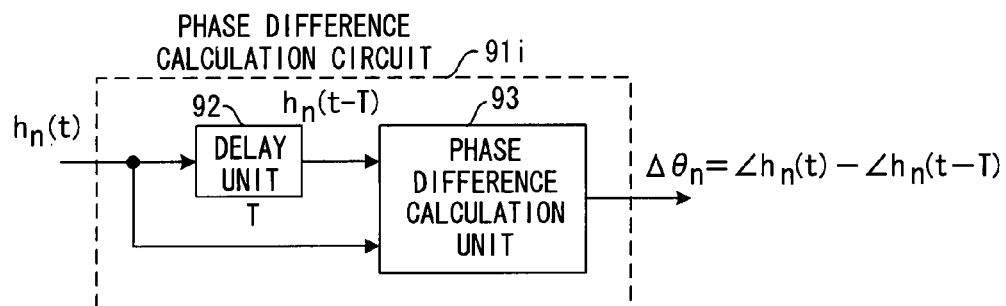
FIG. 16 is a drawing showing the construction of a phase difference calculation unit.

The estimated channel values $h_1$ to $h_{10}$ for subcarriers 1 to 10 are input from the channel estimation unit $62e_1$ for band 1 to the phase difference calculation units $91_1$ to $91_{10}$ of the frequency offset measurement unit. As shown in FIG. 16, the phase difference calculation units $91_1$ to $91_{10}$ comprise a delay circuit 92 and phase difference calculation unit 93, and they detect the respective changes in phase of the estimated channel values $h_1$ to $h_{10}$ during the period T of the interval between pilot insertions as offset frequencies. In other words, when there is an offset between the reference frequency of the base station and frequency of a user (mobile station), the phase of the estimated channel value shifts, and the larger the offset the larger the phase shift becomes. Therefore, the delay unit 92 delays the estimated channel value $h_n(t)$ by the amount of the pilot period, and the phase difference calculation unit 93 calculates the phase difference between the delayed estimated channel value $h_n(t-T)$ and the current estimated channel value $h_n(t)$.

$$\Delta\theta = \angle h_n(t) - \angle h_n(t-T)$$

As shown in FIG. 17, a frequency offset calculation unit $94_1$ uses the average value of the frequency offsets of each subcarrier to calculate the offset frequency for band 1 according to Equation (4) below.

$$f_{\textit{offset}} = \frac{1}{2\pi T} \cdot \frac{1}{N} \sum_{n=1}^{N} \Delta\theta_n \tag{4}$$

It is possible to calculate the offset frequencies of the other bands 2, 3 in the same way.

In the explanation above, the case in which the number of subcarriers is 31 and the number of bands is 3 was explained, however it is clear that the present invention is not limited to these numbers.

With the present invention as described above, it is possible to more effectively use guard band regions by adaptively controlling the method of use of guard band regions, and thus it is possible to improve the frequency utilization efficiency. Moreover, by having the base station adaptively control whether to use or not use guard band regions for data transmission according to the transmission characteristics, feedback information from a mobile station, and the state of use of adjacent bands, it is possible to improve the throughput of a system.

What is claimed is:

1. An OFDM communication method that performs OFDM data communication by dividing a band region into a plurality of bands and assigning each band to a mobile station, comprising:
   monitoring the DOWN transmission characteristics of the bands reported from the mobile stations and the state of use of the adjacent bands; and
   setting whether to use or not use a guard band region on the boundary between bands for downlink data transmission based on the transmission characteristics of the bands and the state of use of the adjacent bands, wherein
   when there is no mobile station assigned to a band, the base station sets to use the guard band regions on both ends of that band for data transmission of the respective adjacent bands.

2. An OFDM communication method that performs OFDM data communication by dividing a band region into a plurality of bands and assigning each band to a mobile station, comprising:
   monitoring the DOWN transmission characteristics of the bands reported from the mobile stations and the state of use of the adjacent bands; and
   setting whether to use or not use a guard band region on the boundary between bands for downlink data transmission based on the transmission characteristics of the bands and the state of use of the adjacent bands, wherein
   when the difference in reception power between adjacent bands is larger than a threshold, the base station sets not to use the guard band region on the boundary between the adjacent bands for data transmission.

3. An OFDM communication method that performs OFDM data communication by dividing a band region into a plurality of bands and assigning each band to a mobile station, comprising:
   monitoring the transmission characteristics in uplink communication of each band and the state of use of the adjacent bands;
   setting whether to use or not use a guard band region on the boundary between bands for uplink data transmission based on the transmission characteristics of the bands and the state of use of the adjacent bands; and
   notifying the mobile stations of how to use the guard band region in that uplink communication, wherein
   when the difference in reception timing of adjacent bands is larger than a threshold, the base station sets not to use the guard band on the boundary between the adjacent bands for data transmission.

4. An OFDM communication method that performs OFDM data communication by dividing a band region into a plurality of bands and assigning each band to a mobile station, comprising:
   monitoring the transmission characteristics in uplink communication of each band and the state of use of the adjacent bands;
   setting whether to use or not use a guard band region on the boundary between bands for uplink data transmission based on the transmission characteristics of the bands and the state of use of the adjacent bands; and
   notifying the mobile stations of how to use the guard band region in that uplink communication, wherein
   when the difference in frequency offset between adjacent bands is larger than a threshold, the base station sets not to use the guard band region on the boundary between the adjacent bands for data transmission.

* * * * *

UNITED STATES PATENT AND TRADEMARK OFFICE
CERTIFICATE OF CORRECTION

| | | |
|---|---|---|
| PATENT NO. | : 7,839,880 B2 | Page 1 of 1 |
| APPLICATION NO. | : 11/896446 | |
| DATED | : November 23, 2010 | |
| INVENTOR(S) | : Seki | |

It is certified that error appears in the above-identified patent and that said Letters Patent is hereby corrected as shown below:

On title page please add:

Item (63)   Continuation of application No. PCT/JP2005/003470, filed on Mar. 2, 2005.

Signed and Sealed this
Fourteenth Day of June, 2011

David J. Kappos
*Director of the United States Patent and Trademark Office*